April 29, 1952  H. A. SKOG  2,594,361
PEAR PEELING MECHANISM
Filed Aug. 26, 1949  16 Sheets-Sheet 1
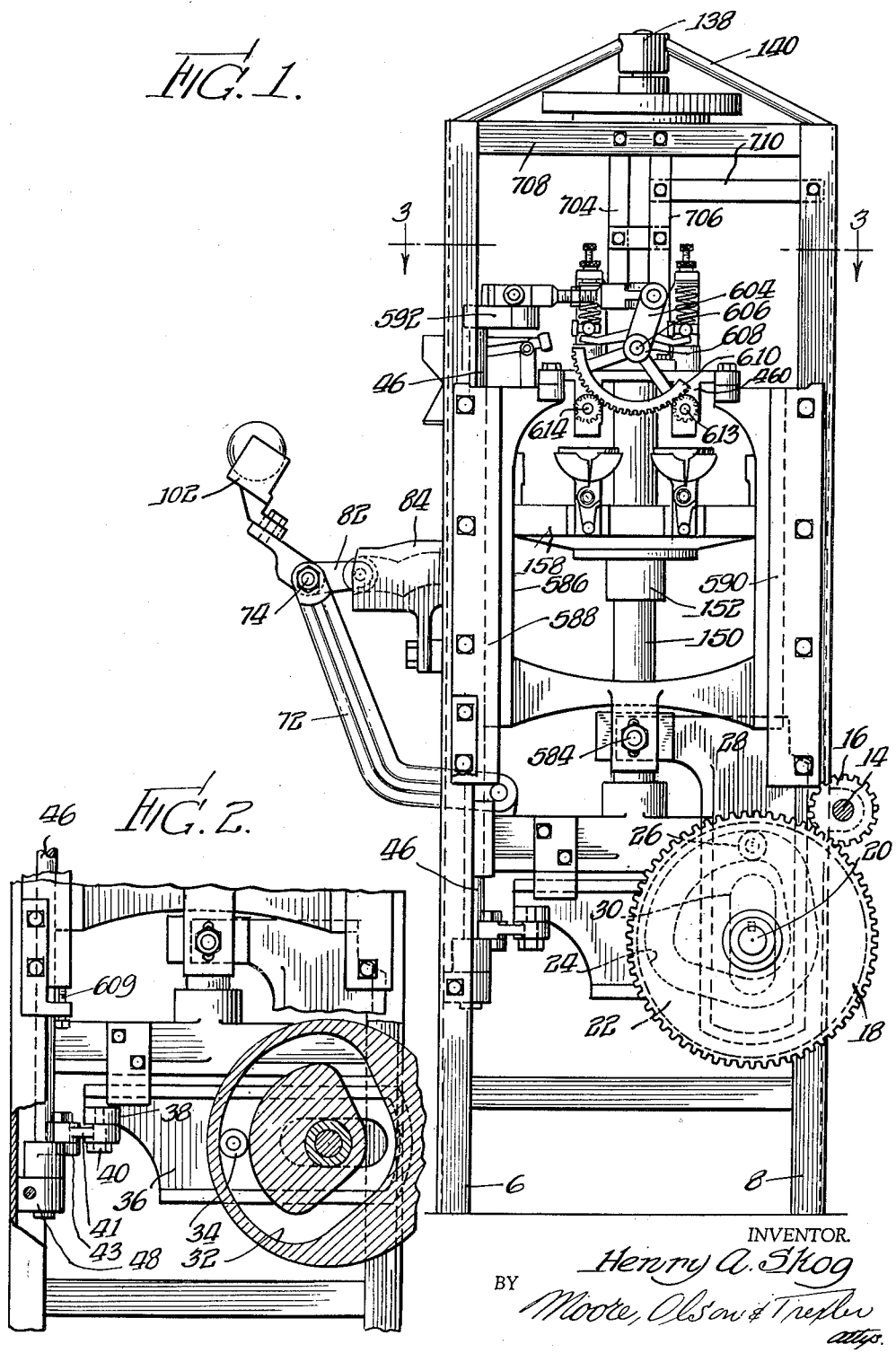
INVENTOR.
Henry A. Skog
BY Moore, Olson & Trexler
attys.

April 29, 1952 H. A. SKOG 2,594,361
PEAR PEELING MECHANISM
Filed Aug. 26, 1949 16 Sheets-Sheet 2
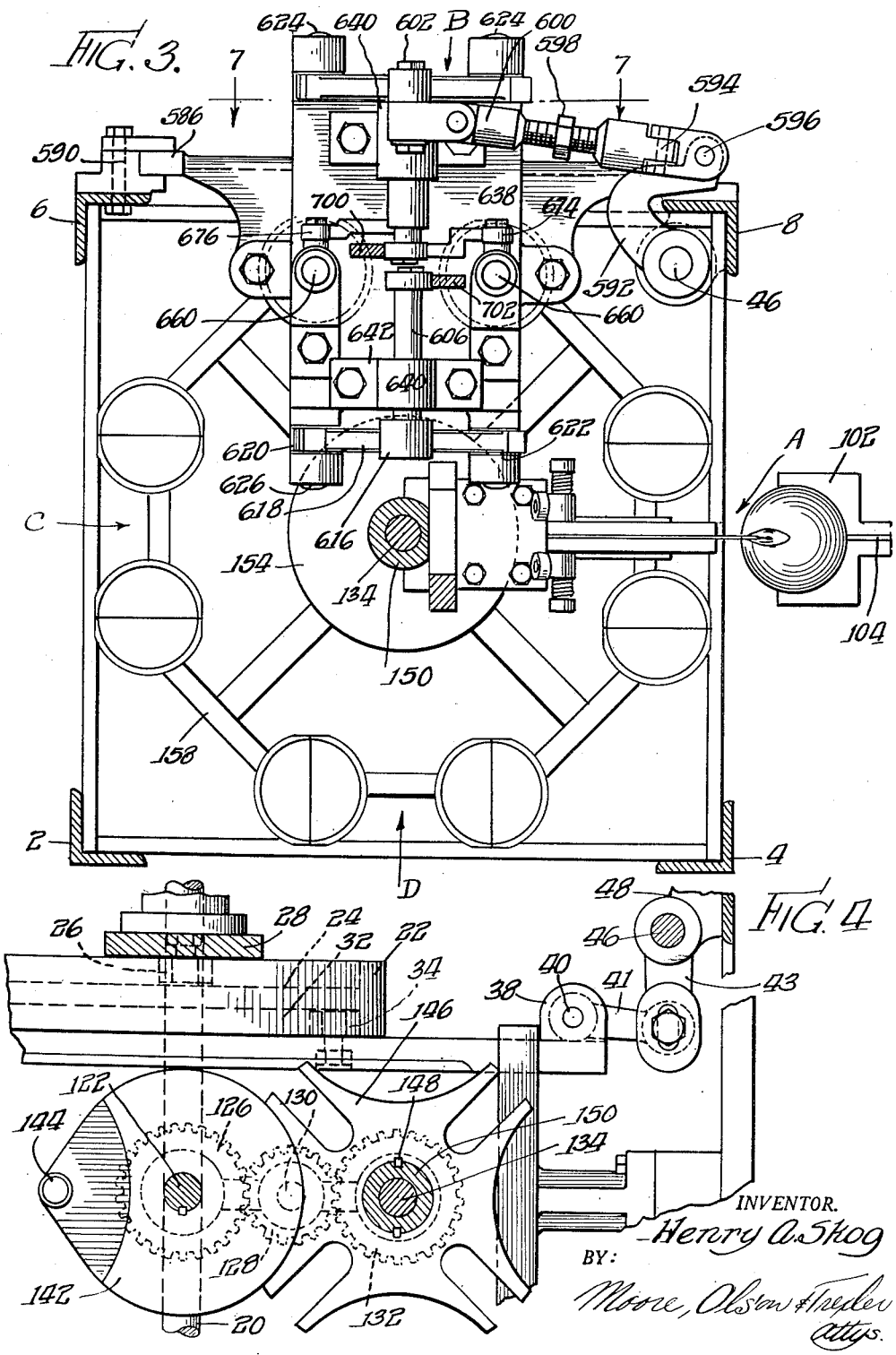
INVENTOR.
Henry A. Skog
BY:
Moore, Olson & Trexler
attys.

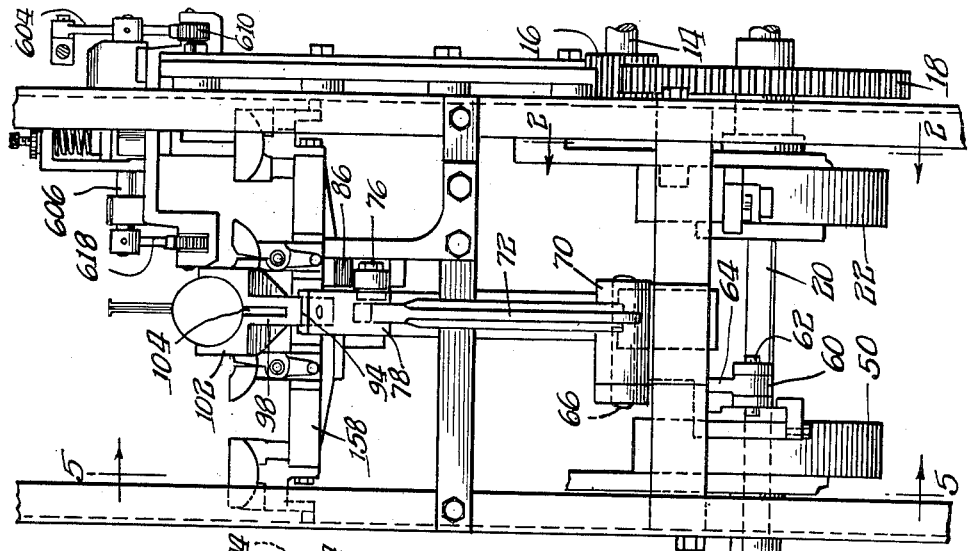
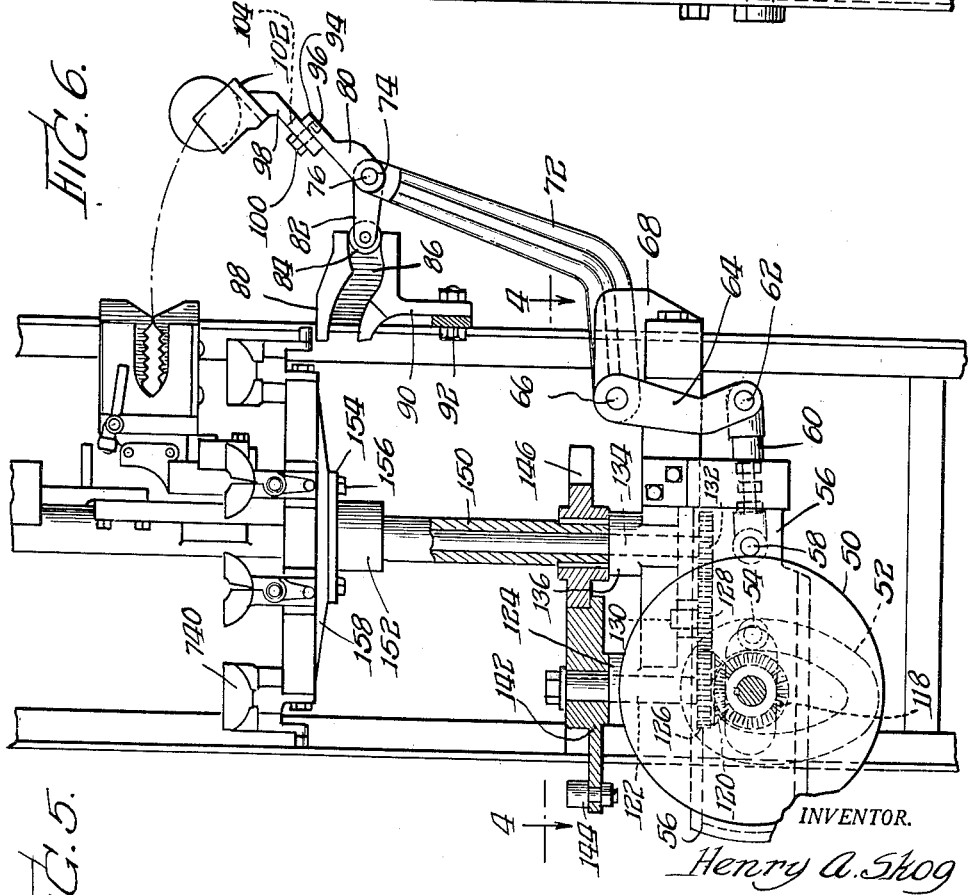

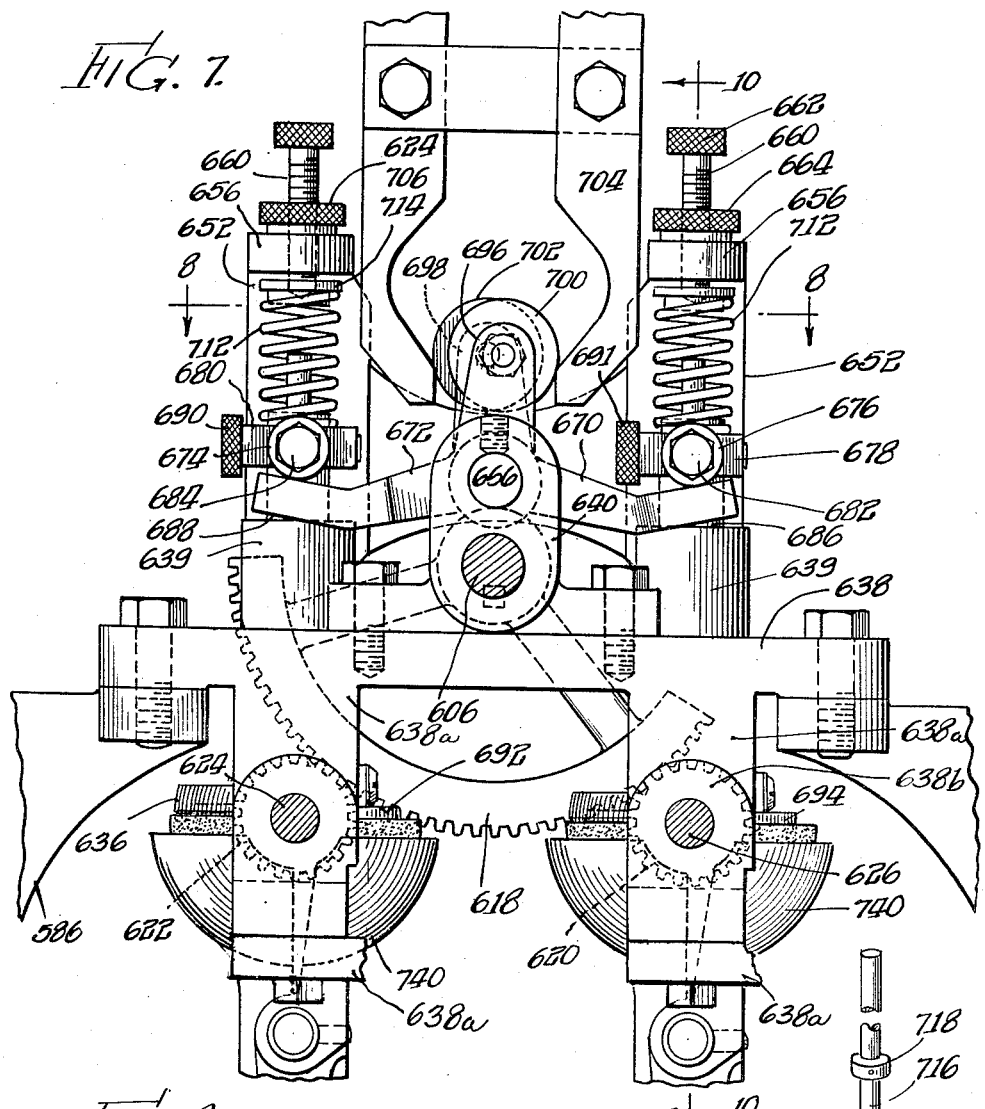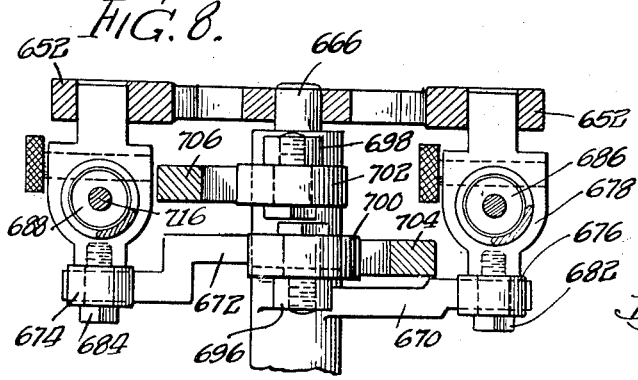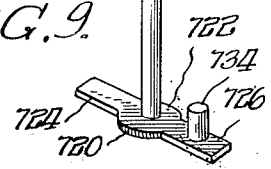

April 29, 1952     H. A. SKOG     2,594,361
PEAR PEELING MECHANISM
Filed Aug. 26, 1949     16 Sheets-Sheet 5
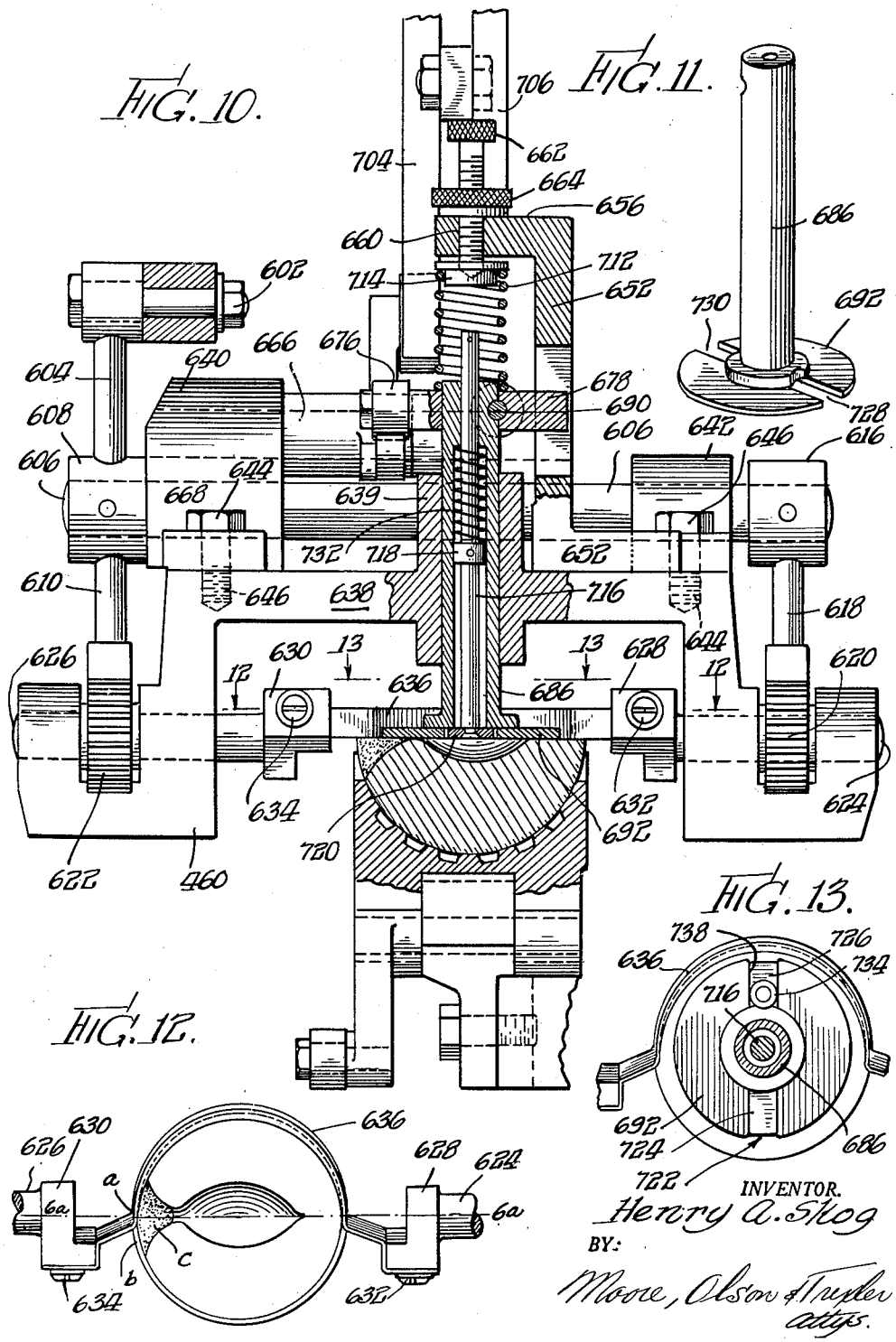
INVENTOR.
Henry A. Skog
BY:
Moore, Olson & Trexler
attys.

April 29, 1952        H. A. SKOG        2,594,361
PEAR PEELING MECHANISM
Filed Aug. 26, 1949        16 Sheets-Sheet 6
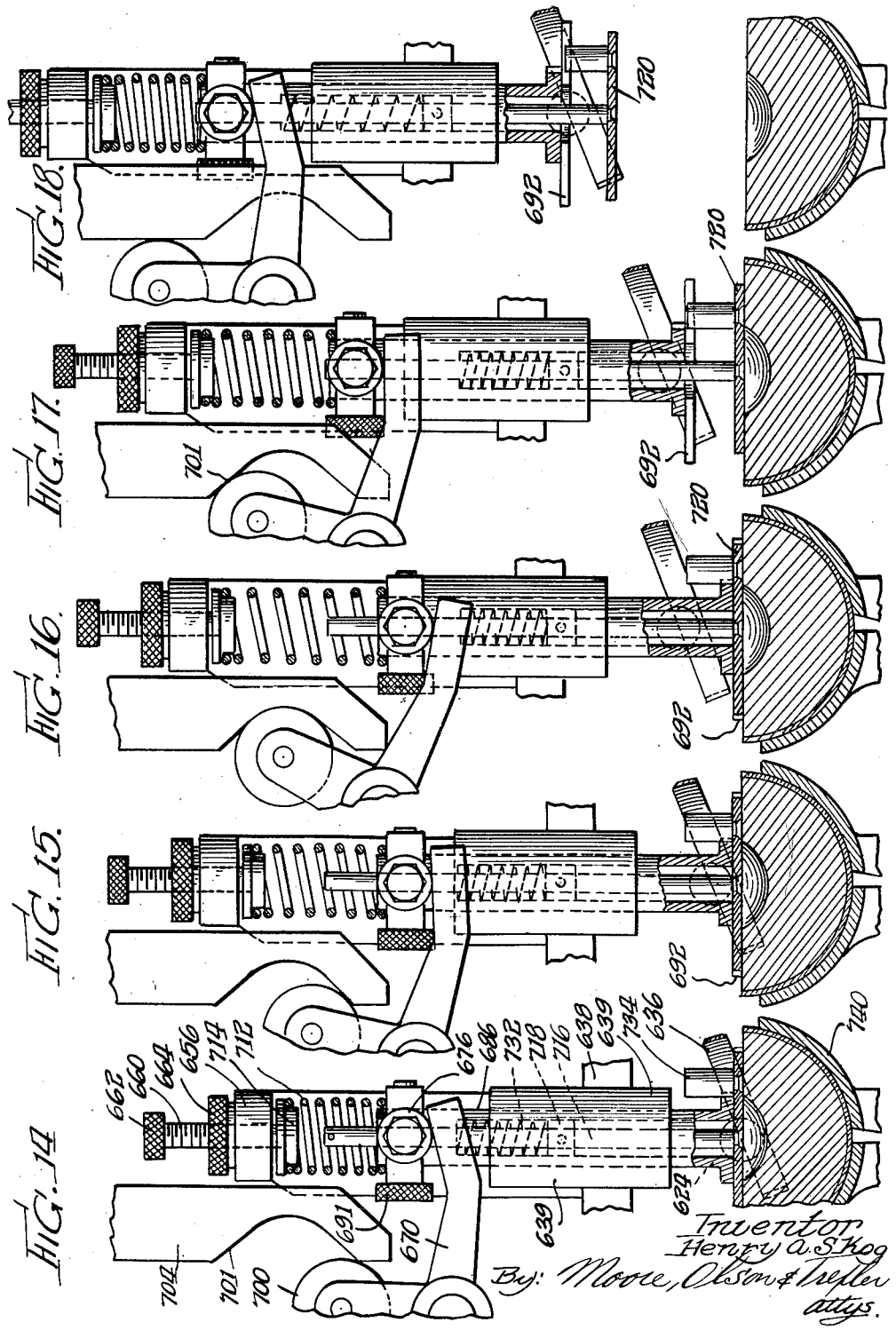

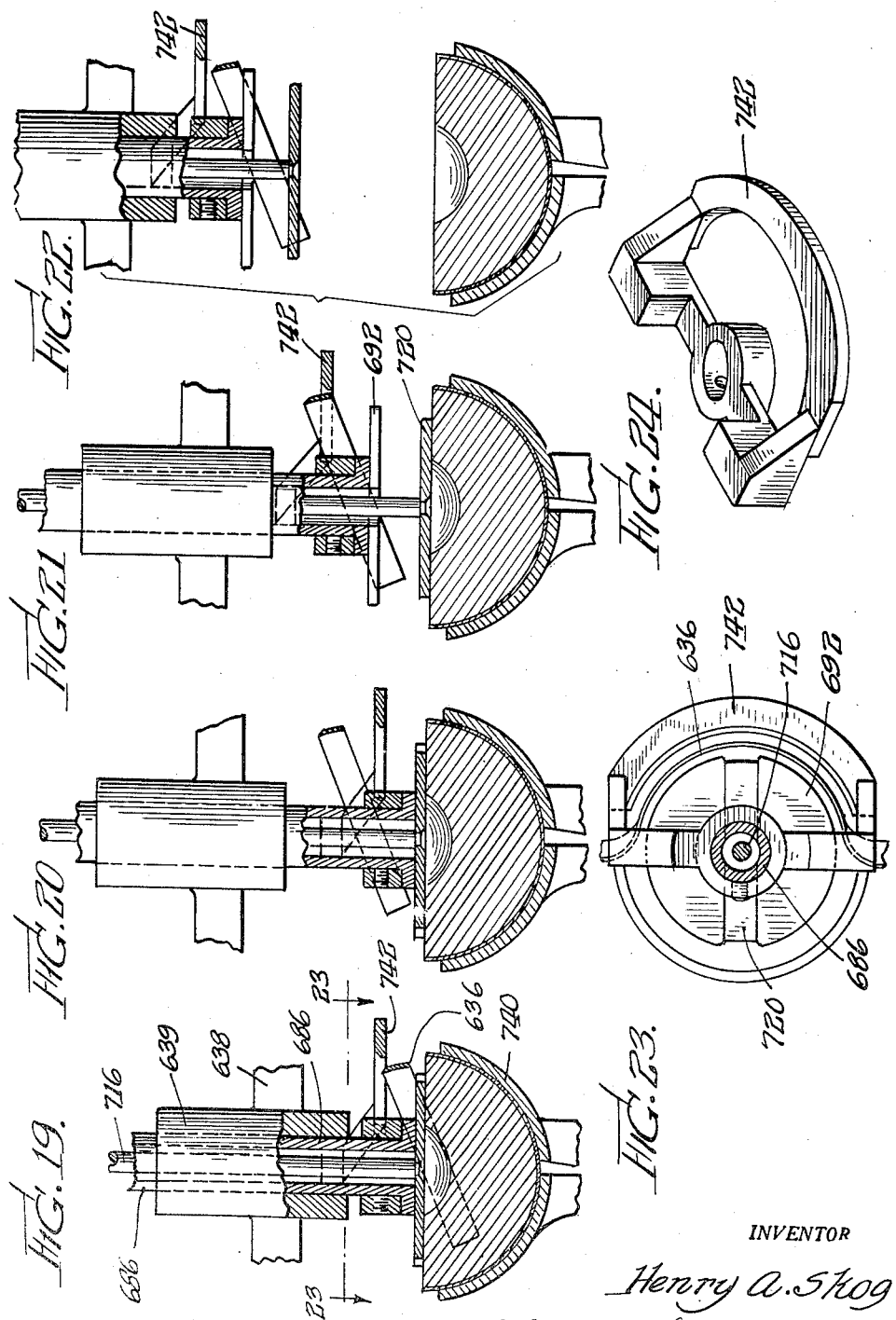

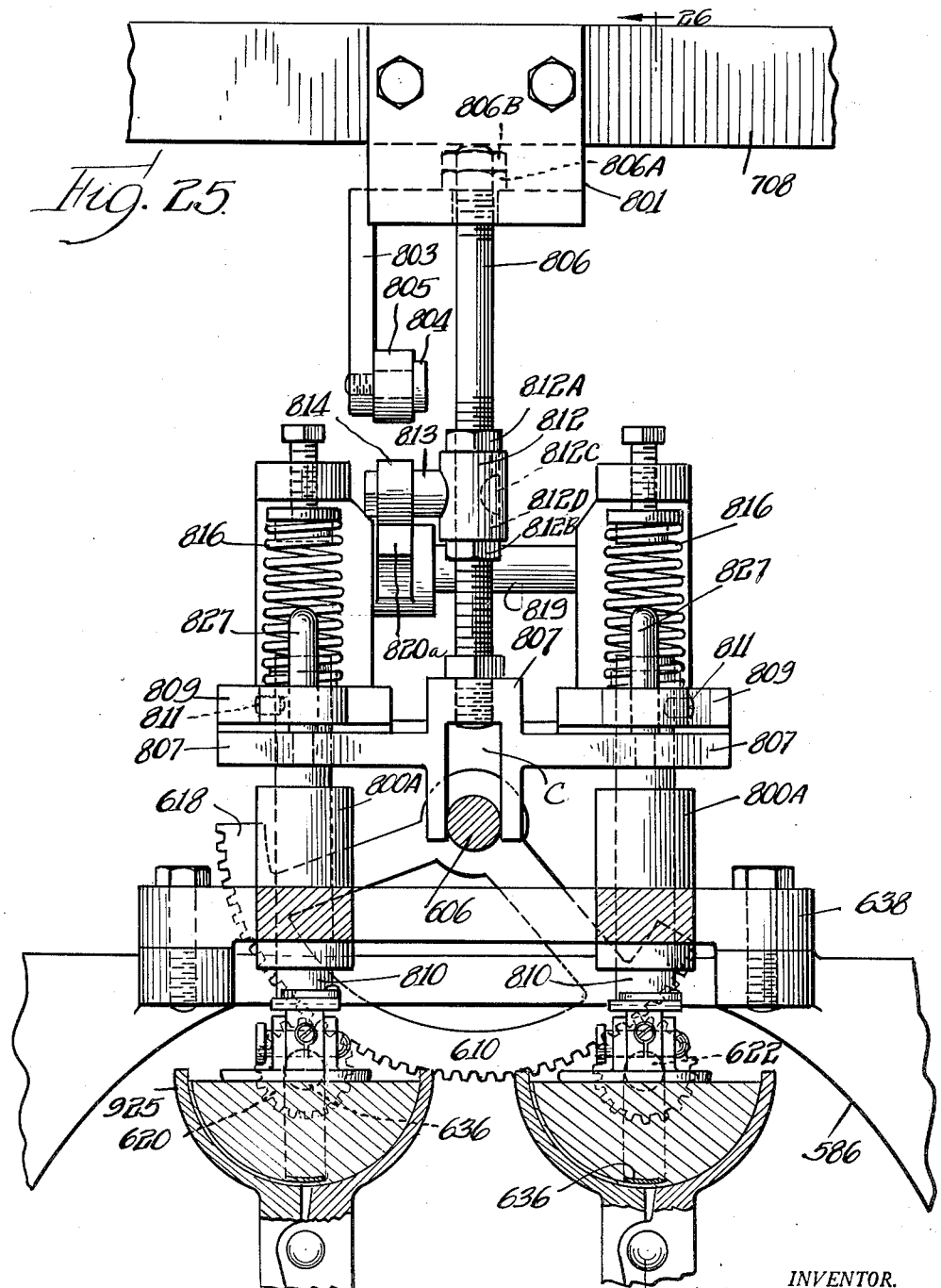

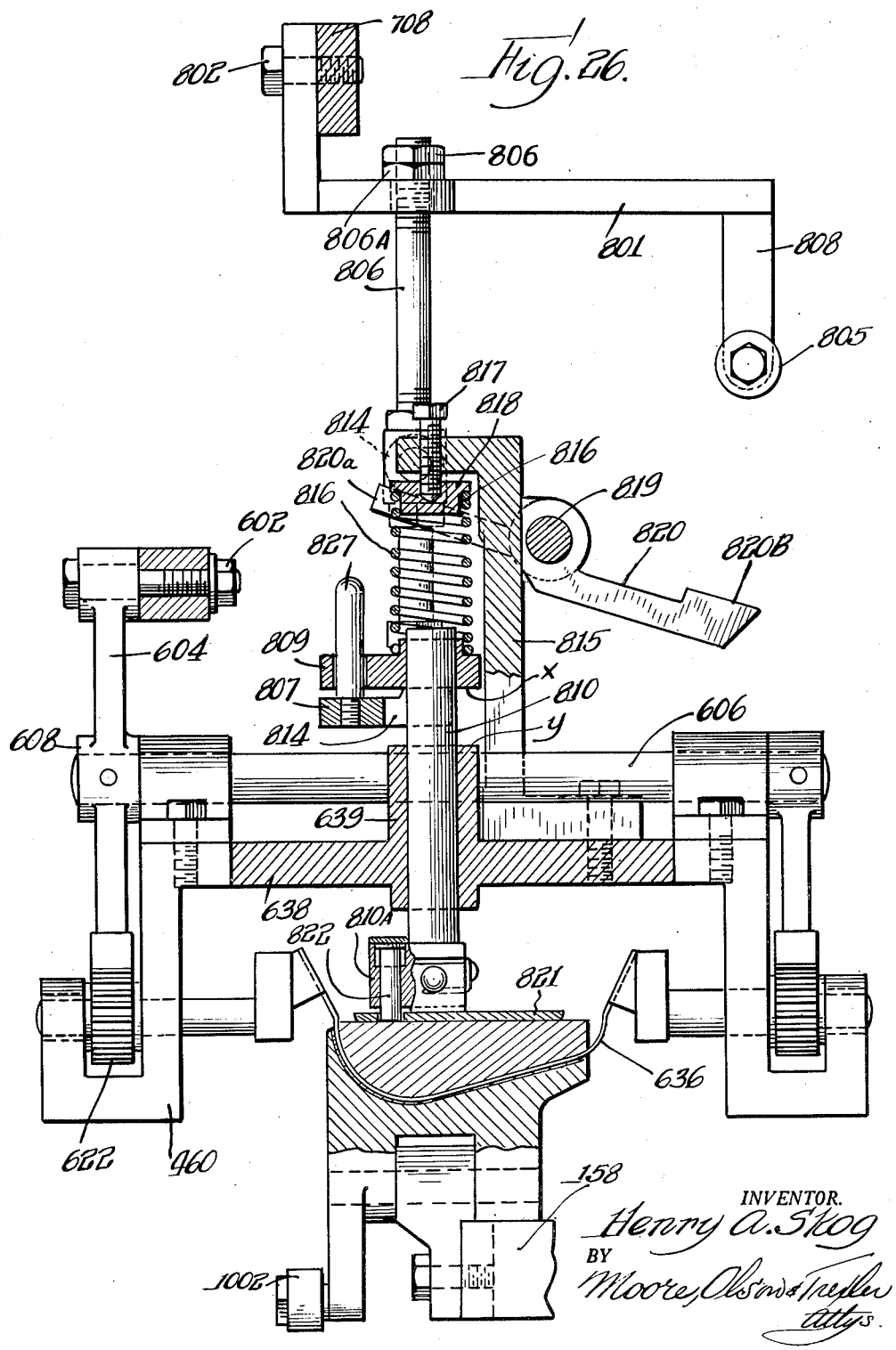

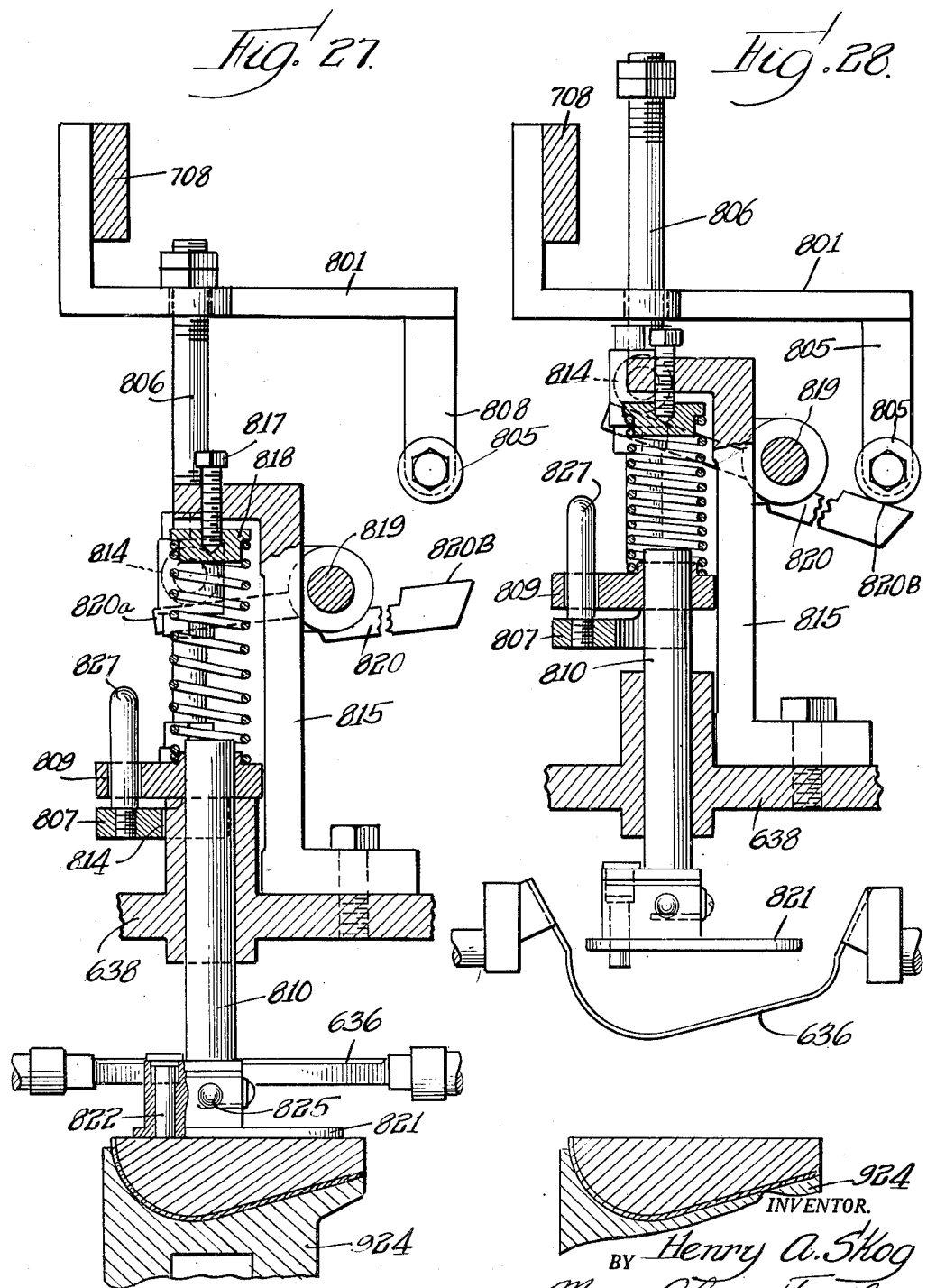

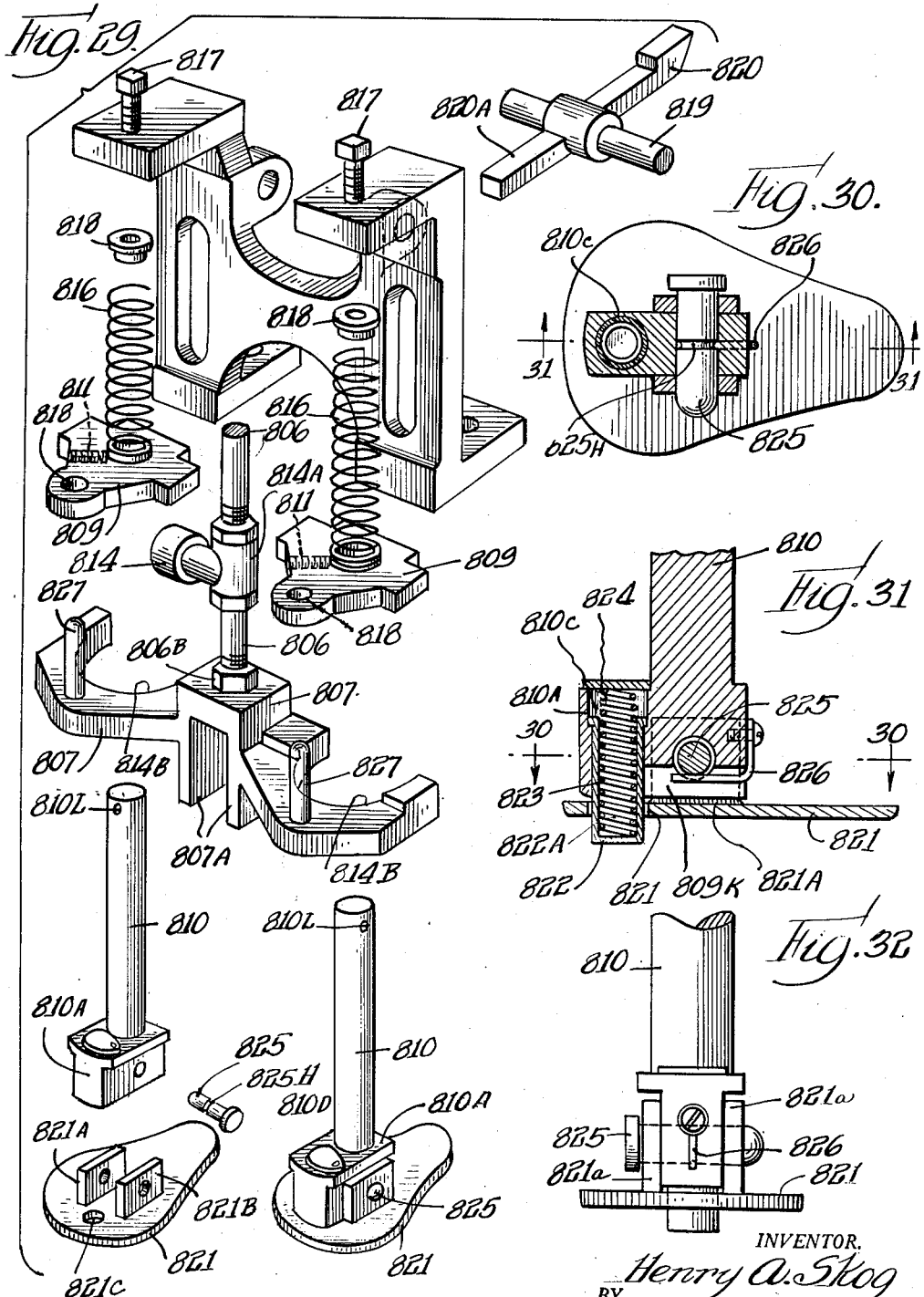

April 29, 1952 H. A. SKOG 2,594,361
PEAR PEELING MECHANISM
Filed Aug. 26, 1949 16 Sheets-Sheet 12
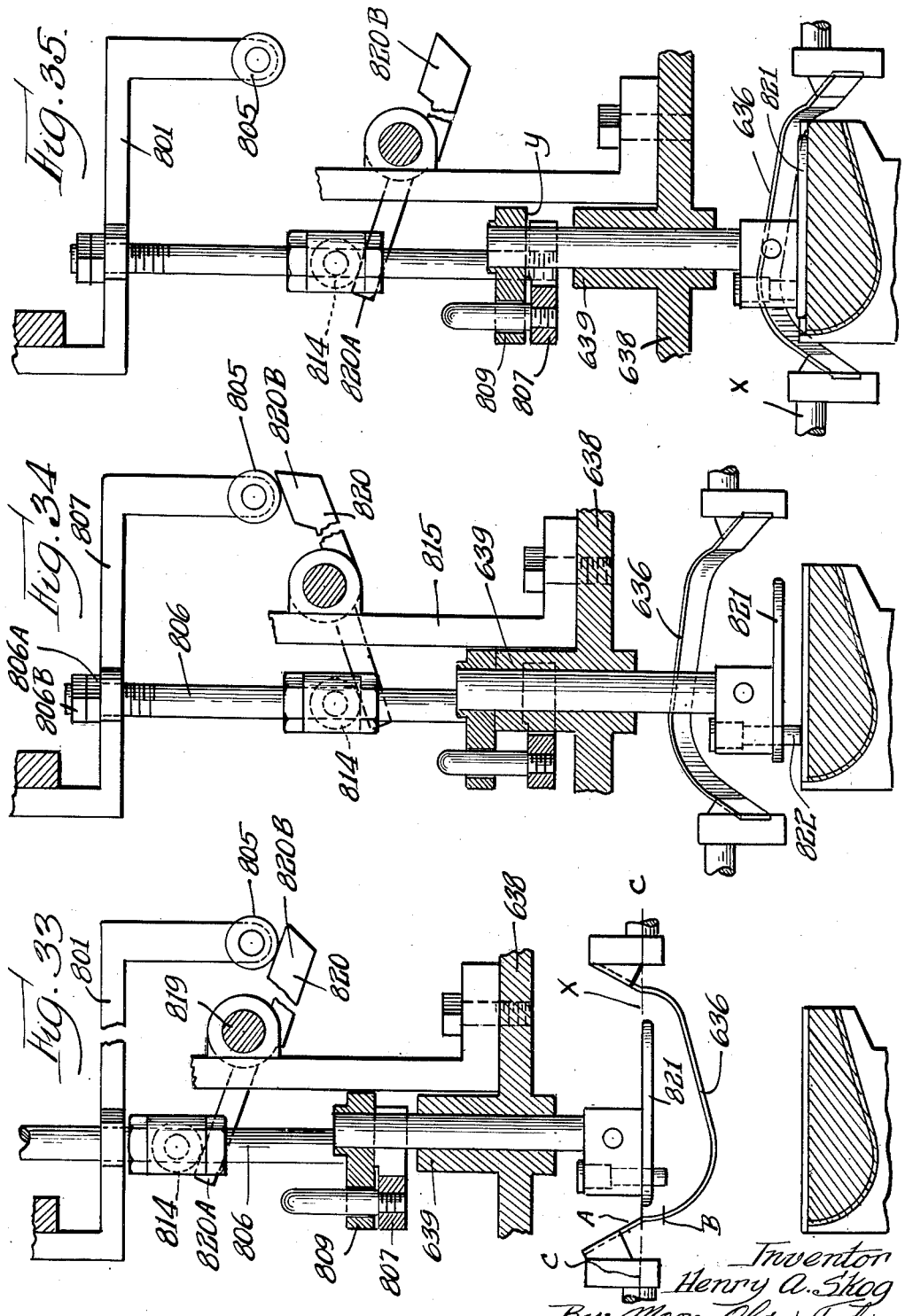

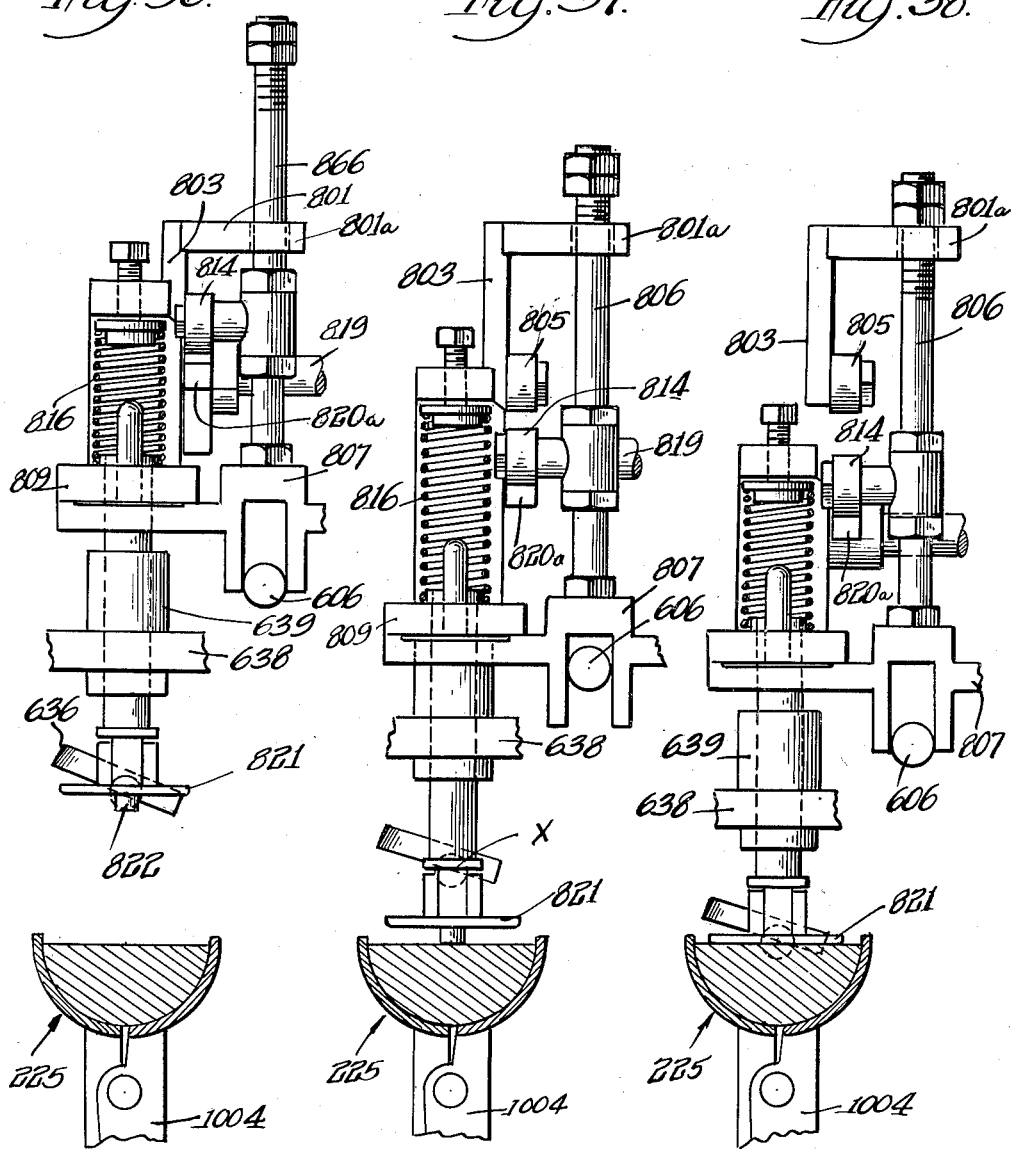

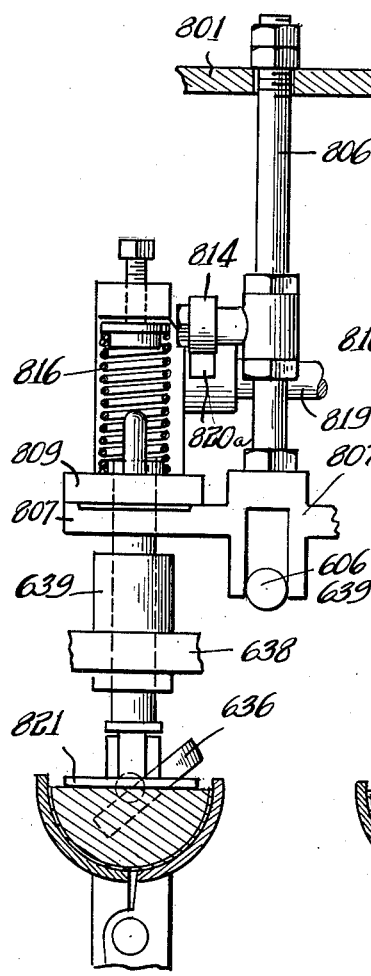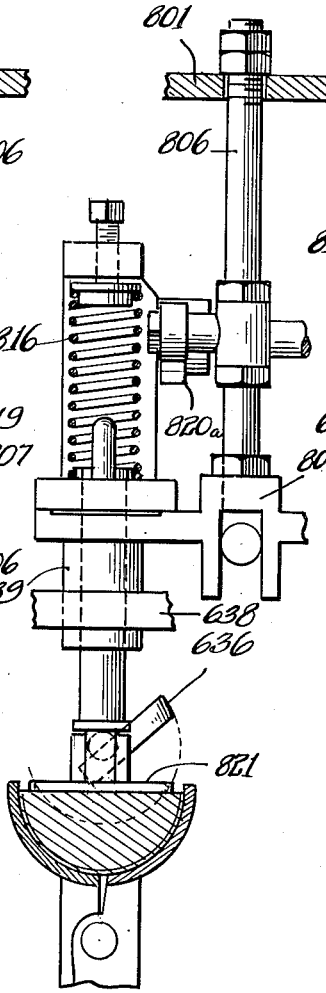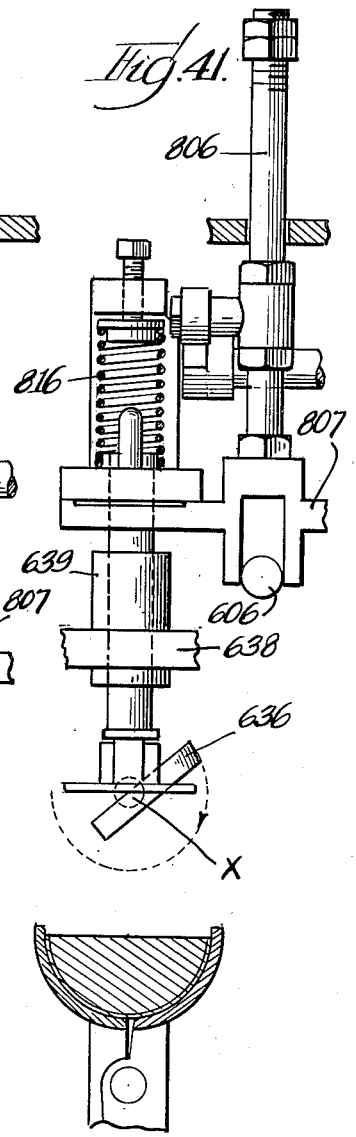

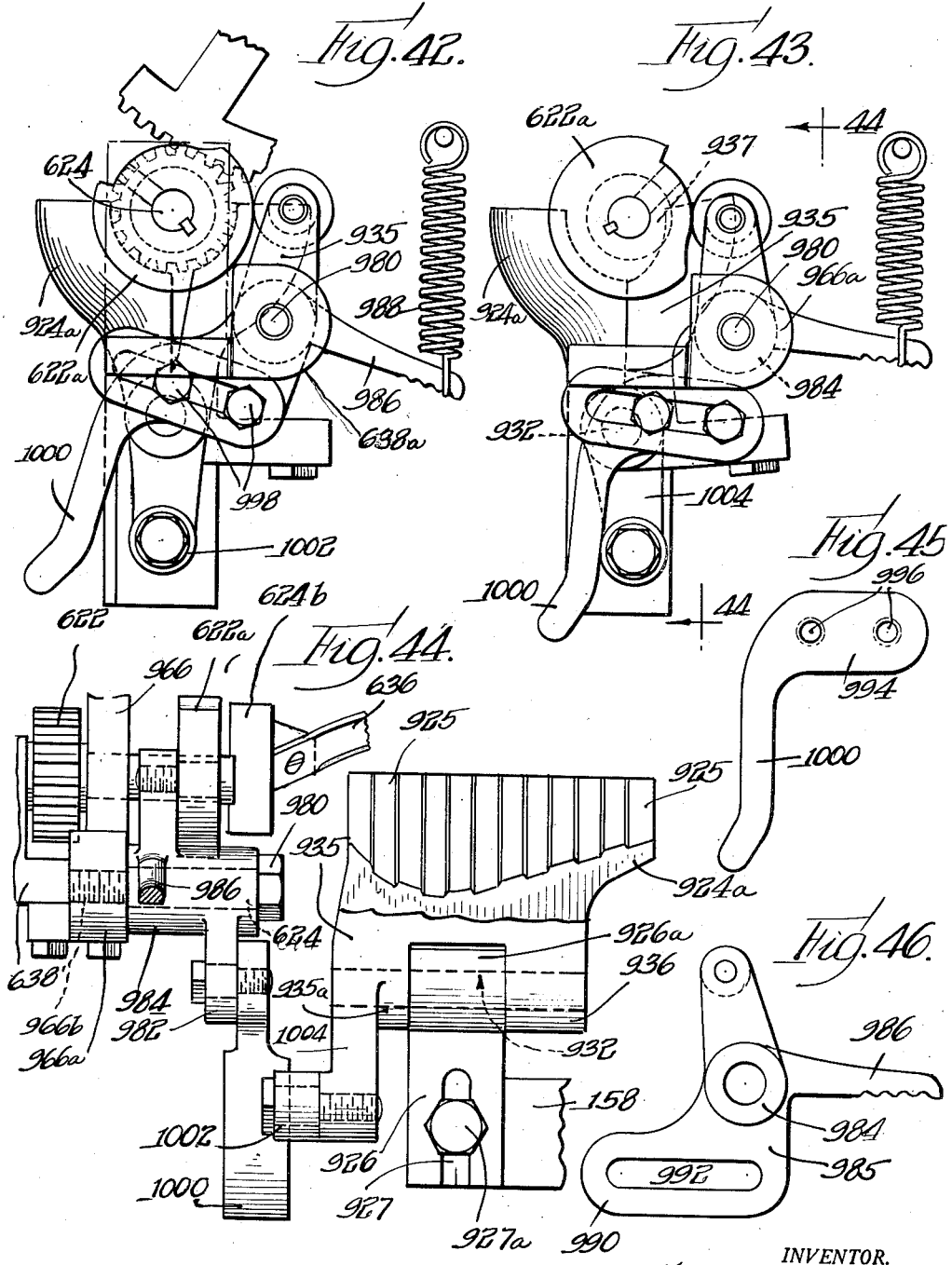

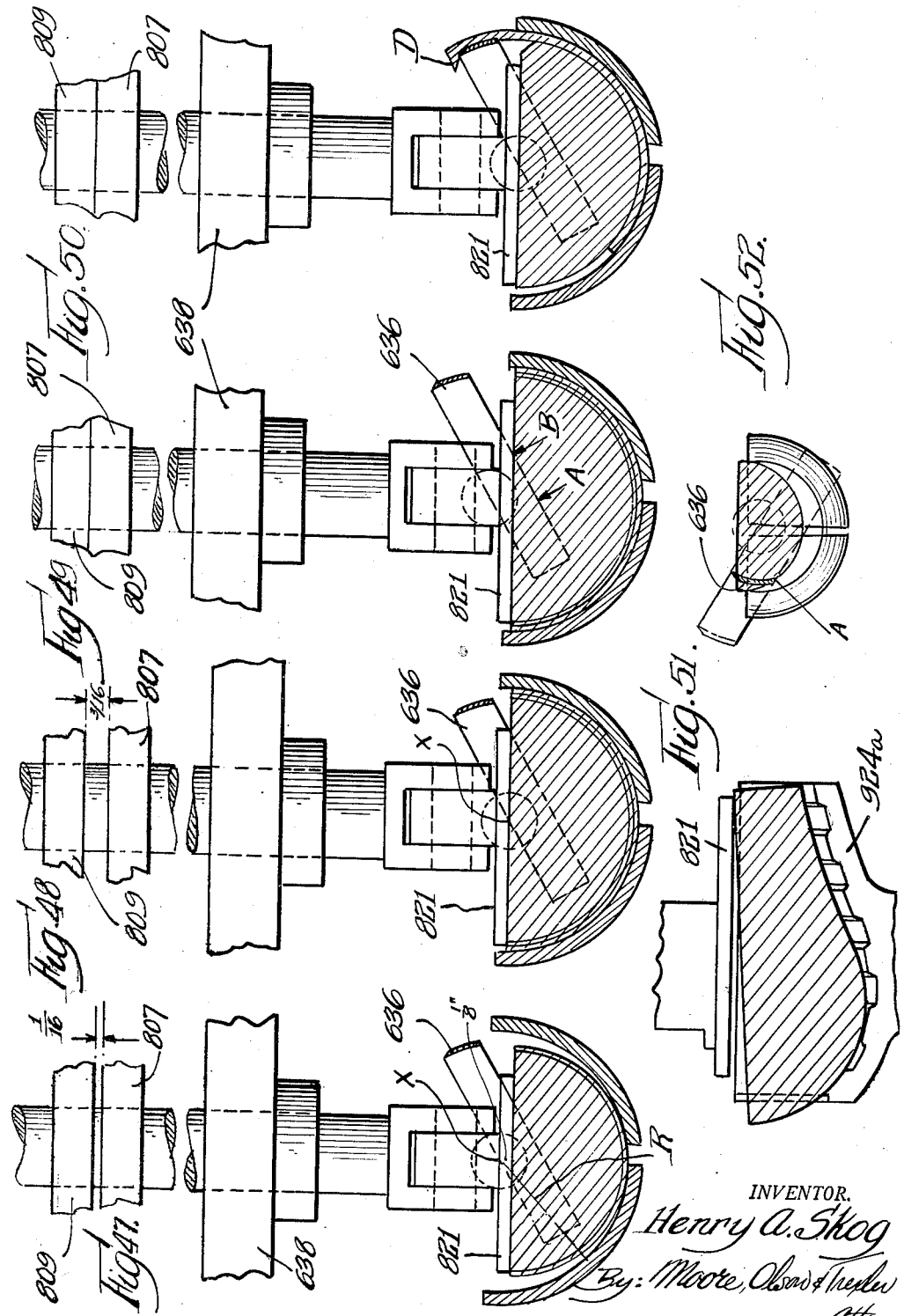

UNITED STATES PATENT OFFICE 2,594,361

PEAR PEELING MECHANISM

Henry A. Skog, Olympia, Wash., assignor to Special Equipment Company, Portland, Oreg., a corporation of Oregon Application August 26, 1949, Serial No. 112,454

30 Claims. (Cl. 146—43)

This invention relates to machines for peeling fruit, including pears and peaches of the freestone type.

The invention is illustrated in connection with an automatic machine having a number of fruit processing stations located thereabout all with respect to which the fruit is passed along a predetermined path and wherein the machine is adapted to form a series of different operations upon the fruit initially fed into the machine. In particular, illustrated in connection with a device for automatically receiving whole fruit including whole pears and peaches, peaches particularly of the freestone variety, and for halving or splitting the fruit, severing and removing the seed section and for also peeling the split halves and for thereafter discharging the peeled halves freed of their seed sections, and for scavenging out the peeling from the half fruit holders and thereafter repeatedly going through the same cycle of operations with respect to a collection of whole fruits fed into the machine. If desired the machine may have an additional station for completely removing or partially removing the peeling at the stem indenture where the fruit is a peach or for additionally removing any other portion of the fruit desirable.

In the present type of device the machine particularly refers to the peeling operation thereof and particularly does it refer to the construction wherein the peeling operation follows a seed severing operation, although not necessarily so, so that the seed section is removed from the half fruit during such seed section severing operation leaving the empty seed section cavity although certain features of the invention are normally adaptable to a machine wherein the peeling operation precedes the said section severing operation.

The machine may be adaptable in certain instances to clingstone types of peach as well as the freestone type and it is even more adaptable to the processing of pears. The present invention is preferably exemplified for purposes of illustration and not by way of limitation, in connection with a machine of my pending application, Serial No. 440,034 filed April 22, 1942, entitled "Fruit Treating Apparatus," which has become abandoned and also in connection with the machine of the prior Skog and Ewald Patent 2,242,243 of May 20, 1941. The invention herein is adapted to replace the mechanism shown at the peeling station and also carries additional mechanisms not shown in said prior identified application and patent. It is to be understood that the inventions herein in the broader sense may be equally utilized in connection with other types of machines for peeling of fruits, particularly pears and peaches.

*Invention as applied to processing peaches*

I shall first describe for purposes of exemplification the invention as applied to a machine for peeling peaches particularly freestone peaches and then will follow with a description of the invention as applied to a machine for processing pears.

In general, the flesh of freestone peaches is more yielding than that of the clingstone variety and since the skin of the freestone peach is held to the fruit relatively lightly by small delicate fibers, during peeling the skin is trailing free and not cut from the flesh of the freestone peach in that particular part of the stem cavity where the knife emerges through the cut face of the peach at the finish of the peeling cut. This release of the skin at the stem cavity where the knife so emerges causes the uncut peeling to bridge across the knife instead of being cut through. This tendency for the released skin to bridge over the knife causes the skin to be held to the fruit and to the skin which is located on the outside of the peeling knife in such a manner that when the peeling head shifts away relatively from the held peach being pulled, this loose skin adhering to the knife will cause the half peach to be thrown out of the cup and cast onto the floor. In prior constructions of the Ewald machines wherein a centrally located knockout pad normally urged downwardly by a relatively light spring was provided to break the suction of the main holding pad contacting the cut face of the half peach, and also in the construction shown in my pending application, Serial No. 440,034 filed April 22, 1942, now abandoned, aforesaid in connection with this prior construction of knockout pad, it was not practical to stiffen the relatively light spring on this knock-out pad because increasing tension of such spring caused excessive pressure on the face of the peach which, in turn, would cause excessive bruises and disfigurement of the face of the half peach. It has been found necessary to provide mechanisms for governing the movement of the associated main pad for preventing the skin of the peach at the stem cavity from adhering to the knife and thereby to prevent the knife in its raising movement from pulling the peach out of the cup and onto the floor all as set forth and claimed herein.

In the prior Ewald and Skog Patent No. 2,242,243 of May 20, 1941, which relates to the processing of pears in particular, but the invention of which is a general application, the main pad 99 does not stay down on the fruit long enough to accomplish the functions accomplished by the mechanisms of the present application. In said patent the main pad 99 goes up with the peeling head 70 except that if the half peach be thicker than normal this pad 99 will be lifted by this extra thickness against the spring action of its stronger spring 120 and the spring 120 will hold the pad 99 there during the peeling operation. Then as the peeling head 70 starts up, away from the cup, the pad 99 will remain but briefly on the fruit until the main pad 99 shifts relatively to the peeling head 70 to reassume its normal position relatively to the head; but this interval is not long enough to accomplish the results accomplished by the construction and carrying out the advantages of the present application because the peeling head 70 lowers until the center about which the peeling knife swings is concentric with the inner walls of the peeling cups. This produces a uniform thickness of peeling all around the outside of the half pear. The under side of the peeling pad since it is spring mounted, may be from $\frac{3}{16}''$ below this center of turning of the peeling knife which will take care of the smallest half pear within the size range being peeled up to about $\frac{3}{16}''$ above the knife center line of turning which will take care of the largest half pear within the size range. For instance, in this Ewald and Skog Patent 2,242,243, when a peeling head is in down position and there is no fruit in the cup, the under side of the peeling pad is about $\frac{3}{16}''$ below the center line of the peeling knife. When there is fruit in the cup, theoretically the under side of the pad can be from $\frac{1}{8}''$ below the peeling knife center line to zero. In practice, this may fail due to inadequate grading for size, all the pears may not fall within the range limit of the cup for instance in the range of 2'' to $2\frac{1}{4}''$ some may be smaller than 2'' and some may be larger than $2\frac{1}{4}''$, in which case if the pear were smaller than 2'' the pad may drop to $\frac{3}{16}''$ below the knife's center line and if larger, the pad would be above the center line. On the other hand if a pear is ripe it will be pushed down into the cup by the pad but if green the whole pear half will ride on the edges of the cup. In this prior Ewald and Skog patent of construction the peeling head is not locked, only the slidably mounted peeling pad stems are locked to produce the effects stated. In other words, the peeling head of this prior Ewald and Skog patent lowers to a position where the peeling knife will swing down through the peeling cups a set, predetermined distance from the inner walls of the cups throughout the entire arcuate swing of the knife, whereas the peeling pad adjusts itself to various thicknesses of pear halves being peeled. In any event, the Mark Ewald and Henry Skog Patent No. 2,242,243, above recited has no means for maintaining the pad 99 in contact with the cut face of the half fruit for a sufficient length of time during the rise of the peeling head carrying the peeling knife, to break any peeling which entangles between the half fruit held in the cup and the raising peeling knife. Neither does it have any mechanism for thereafter rapidly raising the peeling pad after such peeling has been ruptured whereby to position the main pad such as 99 adjacent the raised peeling knife, specifically, such that a bottom portion of the main pad lies substantially on the axis of turning of the peeling knife whereby such peeling knife may subsequently turn clockwise to resume its starting position in the next cyclic operation when the peeling head thereafter moves downwardly to form the next peeling cut.

In the construction of the present application as distinguished from applicant's prior Patent No. 2,242,243, means is provided in association with the relatively movable peeling knife and fruit holding means, which includes main pad mechanism normally held pressed down about $\frac{3}{4}''$ below the rising peeling knife center line or axis of turning to cause any peeling entanglements between the fruit in the fruit holder and the relatively rising peeling knife thereby to be ruptured or severed and this construction and operation is not and never has been in the prior Ewald and Skog Patent 2,242,243 aforesaid.

Among the objects of the present invention therefore are to provide a peeling mechanism for a machine for peeling fruit including pears and peaches and operable in such a manner that in peeling, the skin portions of the peel or skin will not catch or adhere to the peeling knife in a manner such that the fruit will be pulled out of the cup or half fruit receiver during the upward movement of the peeling head; to provide a half fruit holding mechanism adapted to contact the cut face of the half fruit during the peeling operation which mechanism will include means for positively holding the half fruit in the cup or receiver during the initial movement of the peeling mechanism away from the cup or half fruit holder so as to prevent skin or peeling adhering to the peeling knife thereby precluding premature ejection of the fruit from the fruit holder; to provide a pad or auxiliary fruit holding means automatically operative to be brought into contact with the cut face of the half fruit about to be peeled and wherein automatic means is provided for maintaining the main pad or auxiliary fruit holding means into contact with the cut face of the half fruit after relative movement has been imparted between the held half fruit and the peeling knife in a direction to separate the same whereby the half fruit will be held in its fruit holder and in a manner to either break the skin or peeling tending to adhere to the knife or to cause the knife positively to sever the skin or peeling whereby in either event the half fruit will not be prematurely discharged from its fruit holder; to provide in combination with a fruit holder or fruit cup for receiving and holding a half fruit to be peeled, a shiftable peeling head adapted to be positioned adjacent the half fruit holder, the peeling head having an actuatable peeling knife carried thereby and also having an auxiliary fruit holding means in the form of a pad or member or members adapted to contact the cut face of the half fruit and preferably having associated therewith where the type of half fruit warrants, a knockout pad and there being means actuatable by the relative movement between the fruit holder and the peeling head whereby after or simultaneously with the completion of the severing of the peel from the flesh of the half fruit, as the peeling head moves away from the half fruit, the main peeling pad or auxiliary fruit holding member or members on the departing head or on the head where relative movement is provided between the head and the fruit holder, the auxiliary fruit holding member or members will be operable to remain in contact with the cut face of the half fruit sufficiently long to hold the same in the cup whereby either rupturing the skin or peeling to prevent adherence or thereby either completing the section severance of the skin so as to prevent the peach being jerked out of the half peach holder prematurely; to provide means operable after the rupture or severance of the peeling entangled between the peeling knife and the half fruit in the fruit holding means occasioned by maintaining the auxiliary fruit holding means in contact with the cut face of the half fruit until after the peeling knife has risen sufficiently far to disconnect or rupture this entangled peeling, to thereafter raise this auxiliary fruit holding means to move it rapidly to a position relatively adjacent the peeling knife or to move it toward the peeling knife at a rate of travel which is greater than the rate of travel of the upwardly or the relatively moving peeling knife so that this auxiliary fruit holding means, which is preferably of a relatively large area, will be placed sufficiently close to the peeling knife during the subsequent arcuate movement of the peeling knife back to initial peeling position so that the peeling knife will not strike this auxiliary fruit holding means or pad; to provide a knock-out pad arrangement for association with the auxiliary fruit holding means or main pad wherein the knock-out pad is adapted to contact the cut face of the half fruit in a manner so as to bridge over the seed cavity at the cut face of the half fruit, and thereby to prevent the knock-out pad from interfering with the proper shifting movement of the half fruit in the fruit cup during the peeling operation and whereby also to prevent the knock-out pad from gouging into the seed section cavity during the peeling operation and otherwise impairing or injuring the appearance of the half fruit at the cut face thereof. To provide other objects of invention which are particularly adaptable to peeling of half peaches in a manner to prevent uncut peeling from clinging to the peeling knife and yanking or jerking the half peach out of its fruit cup; to provide these and other objects of invention as will be apparent from a perusal of the following specifications when taken in connection with the accompanying drawings wherein:

Figure 1 is an end view of a machine containing mechanism at the peeling head for peeling the flesh of a half fruit.

Figure 2 is a fragmentary sectional view of the lower portion of the machine taken on the line 2—2 of Figure 6.

Figure 3 is a plan sectional view taken on the line 3—3 of Figure 1.

Figure 4 is a fragmentary plan view taken on the line 4—4 of Figure 5.

Figure 5 is a vertical sectional view taken on the line 5—5 of Figure 6.

Figure 6 is a front elevational view showing the feeding station.

Figure 7 is a view of the peeling head shown in lowered position and taken on the line 7—7 of Figure 3.

Figure 8 is a detailed plan sectional view taken on the line 8—8 of Figure 7.

Figure 9 is a perspective view of the knock-out pad.

Figure 10 is a vertical sectional view of the peeling head taken on the line 10—10 of Figure 7.

Figure 11 is a detailed perspective view of the peeling pad and stem.

Figure 12 is a detailed plan sectional view taken on the line 12—12 of Figure 10.

Figure 13 is a view taken on the line 13—13 of Figure 10.

Figures 14, 15, 16, 17 and 18 represent views of the half peach lying in the peeling cups of the peeling turret during the rest period of the turret, and illustrating various positions of the means for operating the main pad mechanism or the auxiliary fruit holding means.

Figures 19, 20, 21 and 22 show a modified form of the stripper mechanism and represent views during the operation of the device.

Figure 23 is a plan section taken on the line 23—23 of Figure 19.

Figure 24 is a perspective view of the stripper mechanism.

Figure 25 is a view similar to Figure 7 showing a modified type of machine for processing pears.

Figure 26 is a vertical sectional view taken on line 26—26 of Figure 25.

Figures 27 and 28 are views similar to Figure 26 but showing the parts in different positions.

Figure 29 is a view showing the associated parts of a peeling head.

Figure 30 is a plan sectional view taken on line 30—30 of Figure 31.

Figure 31 is a vertical sectional view taken on line 31—31 of Figure 30.

Figure 32 is a detailed view of the peeling pad;

Figures 33, 34 and 35 are views similar to Figure 26 and showing the operation of the pear peeling pad lifting mechanisms;

Figures 36, 37, 38, 39, 40 and 41 are views taken at right angles to Figure 29 and further show the peeling pad lifting mechanism for pear machines;

Figures 42, 43, 44, 45 and 46 are views showing the cup closing mechanism in detail;

Figures 47, 48, 49 and 50 are views showing the pear peeling pad action; and

Figures 51 and 52 show peeling knife emerging from large neck pear.

Referring now to the drawings in detail, the machine is shown in Figures 1 and 3 as comprising four uprights of substantially L-shaped formation, such as 2, 4, 6 and 8, whereby to provide a rigid, upstanding, skeletonized, elongated, box-like structure or frame. At the lower portion of this frame there is mounted in suitable bearings fastened to the frame the main power shaft 14, carrying a pinion 16 engaging with the peripheral teeth of a large gear 18 mounted on a parallel shaft 20 which likewise has appropriate bearings in this main frame. Keyed to the shaft 20 within the border of the uprights as shown in Figures 2 and 6, is a cam disc 22 which on one face carries the cam track 24, see Figure 1, in which is disposed for operation a cam roller 26 mounted on a vertically operating slide 28. This slide is provided with a vertically disposed, elongated slot 30 which straddles the shaft 20 whereby to assist in guiding the slide 28 in its vertical reciprocatory movements. This slide is designed for raising and lowering the peeling head hereinafter referred to.

In addition, the cam disc on its opposite face is provided with a second cam track 32, see Figure 2, within which operates a cam roller 34 which roller is attached to a horizontal slide 36 having an outwardly extending lug 38, see Figure 2, in the form of a collar carrying a pin 40, which pin supports a link 41, the outer end being pivotally connected with a crank 43 connected to the lower end of a vertical shaft 46 mounted in suitable bearings 48 on the stationary frame. By interconnecting the horizontal slide 36 and the link 41 with the crank 43 the straight line motion of the slide 36 will cause the circular oscillating motion of the shaft 46 for the purpose of operating the peeling cutters in the manner hereinafter described.

In addition, keyed to the shaft 20, as shown in Figure 5, is a second cam disc 50 provided with a cam track 52 shown in dotted lines in Figure 5, in which operates a cam roller 54 connected to a second horizontal slide 56 having at its outer end a connection 58 to an adjustable arm 60 in turn pivotally connected as at 62 to a crank 64 which is keyed to a shaft 66 mounted pivotally in a bracket 68 rigidly mounted on the main frame of the machine.

The opposite end of this shaft 66 carries a collar 70 having a substantially L-shaped arm 72 as shown in Figures 5 and 6, the upper end of which is provided with an aperture 74 to receive a pivotal pin 76 which passes through the furcations 78 of a bracket 80. In addition, the bracket 80 is provided with a rigid arm-like extension 82 which carries at its outer free end a cam roller 84 adapted to operate in a cam track 86 formed on the bracket 88 having a depending lug 90 bolted as at 92 to two of the vertical uprights 2 and 4 of the main frame. The upper end of the bracket 80 carries an upstanding guide 94 (Figure 5) and a threaded aperture 96 in which is slidably mounted a tongue 98. A bolt 100 serves to maintain the tongue in adjustable position relative to the bracket 80. This tongue, as shown in Figures 5 and 6, carries and supports the fruit receiver hereinafter described.

This whole fruit holding means receiver has the function of manually receiving the whole peach which is placed therein by an operator and upon proper automatic operation of the L-shaped arm 72 the fruit will be positioned with respect to the mechanism in the machine as hereinafter described.

The upper portion of the bracket 98 carries the whole fruit receiver and positioning member for cooperation with the fruit splitting blades hereinafter mentioned. This fruit receiver comprises a cradle-like holder 102. It is open at the top and front so that a whole fruit such as a peach may be placed freely therein by the operator with the suture plane in a vertical position and directly overlying a vertical slot 104, which is formed centrally of and vertically through this holder. This slot extends rearwardly through the upper portion of the fruit holder bracket 98 sufficiently far so that when the fruit holder moves along the dot-dash path of Figure 5 and is given its maximum inward movement toward the fruit dividing or splitting blades the forward edges of the latter, and the front edges of the fruit spreading blades will pass well into the slot in both the fruit holder 102 and the fruit holding bracket 98.

Figures 1 and 5 show the extreme outward position of the fruit holder 102 at which time it is substantially removed from the frame proper.

It will be seen that the fruit holder 102 is of such construction that the entire upper portion thereof is open, whereby the peach may be freely placed therein by the operator from a position above the fruit holder, particular care being taken that the suture plane of the peach in the majority of cases is co-planar with the plane of the slot 104 through the holder. In a majority of cases the suture plane will pass centrally of and through the peach, whereas in other cases the suture plane will be to one side. This latter, however, represents only a small percentage of peaches.

Due to the reciprocation of the cam slide 56 and its linkage connection 60 with the lever 64 and the pivotal axis 66, the fruit carrier operating arm 72 is swung about the horizontal pivot 66 in a vertical plane while at the same time the roller 84 mounted on the arm 82 has imparted to it the motion formed by the shape of the cam slot 86. When the cup 102 starts in from the position as shown in Figure 5 there is a combination of turning of both the arm 80 about the pin 76 and the arm 72 about the pin 66. After the roller 84 reaches the end of the first section of the cam 88, the arms 80 and 72 swing in a relative manner as though the two were locked together. Due to the long distance between the cup 102 and the pivot point 66, the peach will pass onto the splitting blades on a relatively flat arc and will therefore be placed on the blades with a relatively small upward movement as the peach is being positioned on the blades. The object of the double action of the feed cup swing is to allow the cup to be moved a safe distance from the splitting blades with a minimum swing of the arm 72. As the roller 84 moves along the second section of the cam 88 a center of the peach moves along the path shown by the dash-dot line in Figure 5 to a position opposite the pitting blades of the pitting and peach halving mechanism hereinafter referred to.

*Driving mechanism for the central vertical shaft of the machine*

As shown in Figure 5, the horizontal shaft 20 has keyed thereto bevel gear 118 which meshes with a second bevel gear 120 on a vertical shaft 122 having bearings 124 in the main frame of the machine. This vertical shaft 122 carries on its lower end a horizontally disposed pinion 126 meshing with an intermediate gear 128 mounted on a stub shaft 130 having bearings in the main frame. This intermediate gear 128 meshes with a third gear 132 pinned on a central vertical shaft 134. The shaft has a lower bearing 136 carried by the lower frame portion of the machine and likewise has an upper bearing 138, see Figure 1, which is suitably supported by rods 140 connected to the four corners of the uprights 2, 4, 6 and 8. This central shaft has a plurality of functions, it provides a driving mechanism for the spreader blade wiping mechanism hereinafter referred to; it also, through appropriate mechanism, opens and closes the fruit splitting blades; and in addition, through appropriate mechanism, it operates the fruit spreader blades and the fruit holding clamps which cooperate with the spreader blades. Certain of these mechanisms will be hereinafter referred to, while others are more fully set forth and claimed in my prior mentioned pending application Serial No. 440,034, filed April 22, 1942.

*Driving mechanism for the fruit holding turret*

Centrally of the main frame of the machine is located a turret which is provided with a plurality of spaced apart holders for receiving and holding fruit. Particularly the turret is provided with a plurality of spaced apart cup-like holders into which half fruit, in the present instance half peaches, are deposited from the splitting mechanism and the fruit spreaders which transport the split halves into the fruit cups.

The fruit turret intermittently transports the cups from the half fruit feeding station, such, for instance, as A, shown in Figure 3, and at which station the half fruits are deposited one in each cup with the cut face of the half fruit exposed, to a second station, such as B (Figure 3), at which station peeling mechanism cooperates with the half fruits in the fruit holders to peel the half fruit. Subsequently the half fruits in the holders are transported to a station C where the peeled and pitted half fruits are discharged therefrom, leaving the peelings in the fruit receivers or cups. Next, the cups with the peelings therein are transported by the turret to a station such as D (Figure 3), where the peelings are scavenged from the cups, where by the next movement of the turret these cups are transmitted by such movement back to station A where additional pitted half fruits are deposited by the spreader mechanism hereinafter described.

At the station A and operating in cooperation with the movements of the fruit cups which operate in spaced pairs, is mechanism which received the whole fruit from the whole fruit holder 102 and splits or severs the flesh of the fruit preferably along the suture plane thereof and substantially simultaneously therewith grips the pit. The spreader mechanism then functions to transport each half pitted fruit which is thus split by the splitting mechanism into a fruit receiving cup.

Cooperating with each spreader mechanism is means for holding each half fruit on the spreader mechanism during the movement of the spreader mechanism from the fruit splitting mechanism to each fruit receiving cup. In addition, mechanism is present at this station A for operating the fruit splitting mechanism in such a manner that as the split is formed through the flesh of the fruit, the pit of the fruit will be passed into position between portions of the fruit splitting mechanism in such a manner that the pit will be gripped and held while the spreader mechanism moves each half peach away from the held pit and conveys the same to the fruit receiving cups.

Inasmuch as the present machine is designed for operation on freestone peaches, the separation of the held pit from each severed half of the peach is carried out with great rapidity and facility and without any appreciable tearing of the flesh of the peach halves. In addition, mechanism is present at this station A for removing loose pits or bits of fruit flesh from the spreading mechanism so as to prevent clogging or improper positioning of the fruit halves on the mechanism which transports the fruit halves from splitting position to the half fruit receiving holders.

In order to carry out the foregoing functions, the vertical shaft 122, shown in Figures 4 and 5, has keyed on its upper end a Geneva disc 142 carrying the usual Geneva roller 144, which cooperates with the usual type of slotted Geneva wheel 146 keyed as at 148 at the bottom of an elongated vertically disposed sleeve 150 concentrically surrounding the central vertical shaft 134. The upper portion of this sleeve 150 is provided with an enlarged collar 152, which collar is provided with a circular platform 154 to which is bolted as at 156 a spider-like frame 158 (see also Figure 3), carrying a plurality of half fruit receiving and holding holders herein specifically shown and illustrated as half fruit cups. These cups are arranged in four pairs about the periphery of the turret. The cups of each pair are disposed parallel with relation to each other. In other words, they are not disposed radially of the turret and as the cups are intermittently positioned at station A by the turret mechanism when they come to rest, a pair of cups is positioned so that each cup is an equal distance on opposite sides of a line passing centrally through the whole fruit receiving holder 102 as it arrives at its innermost position corresponding to the inward feeding movement of the whole fruit to the fruit splitting mechanism.

This, of course, also means that the two fruit receiving cups of the pair at station A are positioned on opposite sides of a line passing centrally through the fruit splitting mechanism and the fruit spreading mechanism when the fruit splitting mechanism is in a position juxtaposed to the fruit splitting blades.

Also, in the present machine, when a pair of cups is positioned at station A or any other particular station, the cups then remain stationarily at such station and while thus stationary, the fruit processing mechanism of that particular station and in fact all stations immediately becomes operative to carry out the particular processing function of that station and in fact for all stations. Thereafter, the fruit processing mechanism will then swing out of the way and the turret will resume the transportation of a pair of cups to the next particular fruit processing station and at the same time will bring a pair of empty cups into position at station A, which is the station at which a fresh pair of fruit halves will be deposited into a pair of cups.

The construction and operation of the half peach receiving cups is in accordance with the teachings of Ewald Patent No. 2,255,049, of September 9, 1941, except that the contour or shape of the fruit cups themselves in the present instance are designed for receiving and holding half peaches, as distinguished from the shape of the fruit cup of said Patent No. 2,255,049, wherein the fruit cups are constructed for receiving and holding half pears.

In Ewald Patent No. 2,216,165, of October 1, 1940, the cup mechanism per se is shown as designed in shape and construction for receiving half peaches. Therefore, the shape of the cups in the present machine would more closely resemble the shape of the cups in the latter Ewald Patent No. 2,216,165. It is to be understood, however, that the mechanism of the present machine, insofar as it functions to operate on peaches is concerned, differs from the mechanism of Patent No. 2,216,165, which latter patent is likewise designed for processing peaches.

As set forth in my prior mentioned pending application and not herein further described because the same forms the subject matter of the claims of said prior mentioned application, upon operation of the lever 72 the peach in the peach holder 102 is presented to mechanism at station A which cuts through the flesh of the half fruit and separates the pit from the flesh, the two halves of the peach with the pit separated therefrom being deposited on the outside of the spreader blade mechanism which in turn is oscillated to deposit simultaneously the two halves, one each, into the cups at station A, which cups are shown in position in Figures 3 and 6. The peaches are deposited into cups with their longitudinal pit axes in predetermined position, as shown clearly in Figures 10 and 12, it being understood that the pit has already been removed from the pit cavity so that each peach half is deposited into the cup with its cut face uppermost and exposed and with the pit cavity disposed so that when the turret is intermittently shifted by the turret shifting mechanism the two pitted halves will next be brought to station B, shown in Figures 3, 10 and 12, with the longitudinal axis of the pit cavity parallel with the axis of rotation of the peeling blades, hereinafter referred to.

*Peeling mechanism*

The peeling mechanism forming the subject matter of the present application will now be described. The peach peeling head is mounted for vertical reciprocatory movement at station B, see Figure 3. The head is vertically reciprocated by slide 28, and this slide, through a vertical adjustment 584 hereinbefore described in connection with certain Ewald patents, serves adjustably to operate the main vertically reciprocable peach peeling slide 586, which slides in opposed guideways 588 and 590 mounted on corner posts 2 and 4 of the frame. The vertical corner shaft 46, see Figure 2, carries at its upper end a link 592 connected to a universal connection 594 in turn connected by a pin 596 in turn conected to an adjustable link 598, which link at its opposite end has another universal connection 600 connecting with the drive pin 602 which is mounted on the upper end of a lever 604, see Figure 1. This link carries at its bottom portion a collar 608 adapted to swing about a horizontal shaft 606. This collar in turn carries a toothed sector 610 which gears with two pinions 613 and 614 rotatably mounted on the main peeling carriage 460, see Figure 10. The horizontal shaft 606 extends rearwardly and has on its opposite end a collar 616 which carries a toothed sector 618 meshing with a similar pair of pinions 620 and 622. These pinions 613, 614, 620 and 622 are mounted on stub shafts 624 and 626 carried on the peach peeling carriage 460. The inner ends of these shafts 624 and 626 carry blocks 628 and 630 to which are connected as at 632 and 634 the peeling knife 636, of arcuate conformation, suitably shaped to peel the type of peach desired, in the present instance the freestone type of peach. The forward edge of the knife is suitably beveled and sharpened for this purpose.

It will thus be seen that the knife is driven from both ends. The peeling carriage or peeling head likewise carries supplemental means for retaining the half fruit in the fruit cups during the peeling operation, whereby to prevent the half fruit from tilting laterally as the peeling knife passes through the flesh of the half fruit to make the peeling cut. In addition the peeling head carries means for preventing the adhesion of the peeling pad or auxiliary fruit holder that functions to prevent the half peach from tilting in its cup when the peeling carriage is lifted away from the face of the half fruit.

The peeling pad mechanism of the present invention has other functions different from my prior construction in the following manner, now to be described. Referring now to Figure 12, which shows a plan view of the pitted half peach lying in the fruit cup with the pit cavity exposed to view and with the stem indenture unpeeled, it will be noted that for some distance from the fulcrum 6a about which the peeling knife 636 swings, the amount of travel is relatively small, being zero at a. Due to the variation in size and shape of the stem cavities of successive peaches, it is not practical to design a peeling pad with a fruit contacting surface shaped to coincide with the stem cavity. This cavity is therefore left without a support when the peeling knife emerges from the fruit at the finish of the peeling sweep, and since there is no peeling pad support at this point, and since the arcuate travel of the peeling knife is relatively small, and because the skin releases in the path of the knife, but yet adheres thereto on the outside of the blade, and likewise to the flesh of the fruit in the stem cavity, a strip of skin across the peeling knife, between the points b and c will be left uncut. This causes a loss of fruit. Sometimes the skin will be torn away from the stem cavity at the point c. When this occurs the skin folds down on the inside of the blade at the point b so that when the peeling head is raised to carry the peeling knife away from the cup, the peeling is jerked with the knife, carrying the peeled half peach with it and discharging it prematurely from the cup onto the floor. This occurs many times in the peeling of half fruit, and therefore constitutes a distinct loss. The present mechanism hereinafter described eliminates this loss.

In addition, the mechanism to be described provides a knock-out pad which bridges the pit cavity of the half fruit, as distinguished from my prior mechanisms wherein the knockout pad engaged either the pit section itself or engaged in the pit cavity. In the latter construction there was a tendency for the knock-out pad, in engaging within the pit cavity, to prevent the peach from moving over relatively to the walls of the cup during that portion of the movement of the peach relatively to the cup which positions the peach at that wall of the cup adjacent the side of the peach from which the knife blade emerges. By arranging the knock-out pad so as to bridge the pit cavity and to engage only the cut facial portions of the half fruit, the peach is free to partake of its necessary lateral sliding movement during the initial portion of the latter part of its peeling operation. It will be noticed that the lateral wings 724 and 726 of the knock-out pad, see Figures 10 and 13, are arranged in a radial direction which is normal to the longitudinal stem axis or pit axis of the half peach, see Figure 12, so that when during the peeling action the peach is shifted laterally under the action of the peeling blade, the peach will be shifted in a direction parallel with and longitudinally of the elongated knock-out pad. By disposing the longitudinal axis of the knock-out pad in a direction normal to or angularly with respect to the longitudinal stem axis of the half peach, the slidability of the peach along the underside of this knock-out pad is ensured despite the presence of the blossom stem cavity c, see Figure 12, which lies at one extremity of the pit cavity. In short, the elongated axis of the knock-out pad is disposed at right angles to the pit cavity and the blossom stem cavity, thereby ensuring the sliding movement of the half peach beneath and while in contact with the knock-out pad. So also the peach is successfully contacted so as to break the suction at the cut face of the half fruit to permit the main peeling pad to depart from the cut face of the half fruit.

With the foregoing in view, the peach peeling head or carriage is provided at its upper end with an upstanding plate-like bracket 638 which is horizontally disposed and is preferably oblong in shape, see Figure 3. A pair of auxiliary peach holding members, specifically referred to as peach peeling pads, is mounted for vertical reciprocation on or relatively to this plate 638, and each pad is adapted directly to overlie and cooperate with the cut face of the half fruit as the latter is held in its receiving cup, and also to cooperate with a peeling knife which is adapted arcuately to swing through each cup to effect the peeling operation.

This plate 638 is provided with opposed bearings 640 and 642, for the shaft 606 hereinbefore mentioned. These bearings are bolted as at 644 and 646, see Figure 10, to the top of the plate of the peeling head 638. As hereinbefore mentioned, the two ends of the pairs of stub shafts 624 and 626 carry the pinions 613, 614, 620 and 622, each pair of pinions, such as 620 and 622, and 613 and 614, meshing with a gear sector such as 610 and 618, there being one of these gear sectors at each end of the head, in mesh with each of the pinions. These gear sectors 610 and 618 are in turn pinned to the shaft 606 and thereby are simultaneously driven therefrom through the lever mechanism 604, 602, from the vertical corner shaft 46. By means of the foregoing construction the two knife oscillating shafts are driven simultaneously at each end.

The peeling head and fruit holding means are relatively shiftable. In the present arrangement the peeling head is vertically reciprocable and is brought down upon a pair of cups simultaneously to position the peeling knives and the pad mechanisms directly upon the cut face of the half fruit in each cup, the pads contacting the cut face of the half fruit and the peeling knives being positioned directly at the mouth of the cup in position so that when the peeling knives move arcuately they will swing through the cups.

As before stated, there is a pair of pads for each cup. These pads are adapted to be positioned against the cut face of each half fruit while the half fruit is in its cup, so as to prevent the half fruit from tilting laterally in its cup as the peeling knife passes laterally through the flesh of the half fruit in the cup.

Each pad mechanism comprises an upstanding bracket 652, suitably bolted to the peeling head 638. This bracket is preferably of Z-shaped construction and its upstanding portion has at its top a laterally extending flange or arm 656, having a threaded opening through which passes a threaded bolt 660 having a knurled head 662. In addition there is a locking nut 664 which threadedly engages the threaded bolt 660 to hold it in any adjusted position.

In the present construction there is mounted on the peeling head, above the peeling knife drive shaft 606, a short shaft 666 mounted at one end in the bearing 640, suitably fastened to the top bar 638 of the peeling head 460, and at the other end in the bracket 652 (see Figure 10). Independently, rotatably mounted on the shaft 666 are two sleeves each having a rigid lever. These levers 670 and 672 which engage rollers 674 and 676 that are studded to guide blocks 678 and 680 by the studs 682 and 684. The guide blocks 678 and 680 are fastened to the top of the main peeling pad sleeves 686 and 688 by means of the pins 690 and 691 whereby any vertical movement imparted to the rollers 676 and 678 will be imparted to the main peeling pad sleeves 686 and 688. As shown in Figure 11 these peeling pad sleeves 686 and 688 carry at their bottoms the main peeling pads 692 and 694. These peeling pads, as before stated, are supplemental fruit holders which engage the cut faces of the half fruit. Rigidly attached to the sleeves on shaft 666 and which sleeves carry the levers 670 and 672 are projecting arms 696 and 698, to the outer ends of which are rotatably fixed the rollers 700 and 702. These rollers are positioned so that in certain movements of the peeling head they will engage stationary cams 704 and 706. These cams are oppositely disposed and have confronting cam faces with the rollers 700 and 702 operating therebetween. These stationary cams are bolted to the top frame 708 of the machine and are also secured by a lateral frame 710 to the main frame of the machine. Thus the cam assembly is rigidly held in place to the main frame of the machine.

By reference to Figure 10 it will be noted that the sleeve 686 of the main peeling pad slidably passes through an elongated boss forming a bearing 639 preferably formed as an integral part of the peeling head 638. There are, of course, two of these bearing boss heads 639. A coil spring 712 is compressed between an adjustable head 714 carried by the bottom portion of the adjusting screw 660 and the upper end of the sleeve 686 and its block 678, by means of which construction the spring 712 tends always to force the main peeling pad 692 downwardly relative to the carriage or peeling head 638. In addition, the main peeling sleeve 686 is bored out longitudinally to receive the knock-out stem 716 which is of the general shape shown in Figure 9 and includes a head 718 pinned to an intermediate part of the stem. The stem at its bottom comprises a suction breaking or knock-out pad 720 which at its central portion 722 is generally circular to fit a corresponding circular portion of the main pad 692 and this circular portion has two diametrically disposed lateral wing portions 724 and 726 which are of sufficient length to bridge the stem cavities of various diameters and sizes, so that the opposed ends of the wings 724 and 726 will always contactingly overlie the cut face of the half fruit on diametrically opposite sides of the pit cavity. The main peeling pad 692 is correspondingly recessed as at 728 and 730 to receive these wing portions 724 and 726 of the knock-out pad, and in addition is countersunk centrally to receive the central circular portion 722 of this knock-out pad. Thus, when both knock-out pad and main pad contact the cut face of the half fruit, the bottom surface of the knock-out pad will lie flush with the bottom surface of the main pad. A relatively weaker spring 732 is confined between the collar 718 and the upper end of the bore in the main pad sleeve 686, which tends normally to force the knock-out pad below the surface of the main peeling pad. The knock-out pad is provided with an upstanding projection 734 to keep the knock-out pad in alignment with the recess 738 in the main peeling pad in all relative positions assumed by the main peeling pad and the knock-out pad.

In the peeling operation the mechanism operates substantially as follows. Figure 14 shows the peeling head in the down position, with the main peeling pad 692 in contact with the cut face of the half fruit and likewise with the knock-out pad in contact with the cut face of the half fruit. In approaching this position it will be understood that as the peeling head comes down, since the knock-out pad is normally in a position below that of the peeling pad, due to its lighter spring, the knock-out pad will first be pushed upwardly, when it contacts the cut face of the half fruit, into the countersunk portion of the main pad, and also into the slotted portions of the main pad 692. The peeling head continues to come down and the cutting knife swings counterclockwise arcuately from the cut face of the half fruit through the body of the fruit to completely peel the fruit. Figure 14 shows the peeling knife at the completion of the peeling cut. Now as the peeling head rises away from the cups containing the half fruit, the roller 700 carried by the ascending peeling head rolls on the stationary camming surface 701, thereby permitting the roller 700 under pressure of its spring to move laterally in a clockwise direction, which in turn causes the arm 670 to move downwardly in a clockwise direction (see Figure 7). When the arm 670 moves in a clockwise direction it releases the guide block 678 so that the guide block 678, under the influence of the spring 712, tends to push down on the sleeve 686. This action in effect causes the main peeling pad sleeve stem urged by spring 712 to slide down relatively to the ascending peeling head. In other words, the camming action is such that the main peeling pad 692 will remain stationary with respect to the cut face of the half fruit resting thereon and holding down the peach while the peeling head rises carrying with it the peeling knife, and this action continues until the peeling knife has raised to a point where any entanglements between the portions of the servered peel still connected to the half peach and which have entangled with the peeling knife will be broken or severed by the separation of the peeling knife from the face of the half fruit during this separating movement thereof. When the roller 700 has reached the point as shown in Figure 16, the main peeling pad 692 is just about to begin an upward ascent, and since the peeling head is still going up, there is a quick pick-up of the main peeling pad from the face of the fruit. This upward movement of the main pad is accomplished by the power action of the arms 670 and 672 operated by the movement of the cam portion 701 and the roller 700 to impart to the main pad a movement upwardly or toward the peeling knife at a rate of travel greater than the movement of the peeling head so as quickly to position the main pad as shown in Figure 18 closer to the center of turning or to make the main pad catch up in its heretofore delayed movement with relation to the peeling knife so that upon the subsequent arcuate peeling movement of the peeling knife the pad will be positioned sufficiently close thereto so that the knife will not strike this main pad. To accomplish this, the means such as the cam 704 and arm 670 and the studs 676 are provided. This quick pick-up is shown by the action in Figure 17 where the roller 700 is rolling counterclockwise against the cam face 701 of the cam 704. All of this time the spring 732 is exerting a pressure on the knock-out pad 720 which is contacting the cut face of the half fruit on opposite sides of the stem cavity and maintains the fruit in the peeling cup. However, during this time the pressure of either the main pad or the knock-out pad has not been such as to preclude the lateral shifting of the peach relatively to the walls of the cup as the cup sector 740 will shift laterally to the right to permit the concentric positioning of the peach cup segments in the complete peeling operation, in accordance with the disclosure and claims of Ewald Patent 2,255,049 of September 9, 1941. It is understood that as the main peeling pad departs from the cut face of the half fruit, the knock-out pad remains in contact with the cut face of the half fruit so as to break the suction between the main pad and the somewhat sticky cut face of the half fruit, all as explained in the prior Ewald patent. Hence, since the main peeling pad covers most of the flat surface of the half fruit, as the peeling knife rises with the peeling head, and since the main peeling pad holds the fruit down in the cup until the peeling knife is clear of any entanglements caused by the peeling not being cut through, the half peach is not disturbed in its position within the peeling cup. That is, it is not pulled out of the peeling cup.

In an alternative construction, but which is not necessary to the proper functioning of the hereinbefore mentioned structure, a stripper ring is provided to strip any adhering peeling from the peeling knife. The stripper 742 is a circular ring attached to the peeling pad stem 686, and which wipes down across the outside of the peeling blade, thereby removing any peeling entanglement over the peeling blade and thus preventing the entangled skin from pulling the half peach out of the cup.

*Peeling construction for pear machines*

Figures 25 to 46 inclusive show those parts of the peeling mechanism and cup construction for adapting the principles of the invention to the processing of pears as distinguished from peaches. In describing the construction of Figures 25 to 46 inclusive those parts of the main machine which are common will be designated and described by the same numbers those same parts are identified in the preceding description. Figures 25 and 26 show the peeling head down or in the peeling position for peeling pears. This pear peeling machine embodies the main constructional features of the machine heretofore described for peeling peaches but it differs from the first machine in the essential features which will now be described. Bolted to the top frame 708 as shown in Figure 26 is a bracket 801 which extends downwardly and has an arm 803 supporting a stud 804 on which is rotatable the roller 805. A vertically shiftable rod 806 has at its upper end two adjacent nuts 806A and 806B which support this rod 806 and provide a means of adjusting the peeling pad height as shown in Figure 26. At the lower end of this rod 806 is the peeling pad lifting bracket or head 807. This peeling pad lifting bracket 807 is raised at times by a power actuated lever mechanism through the intermediary of the rod 806 rigidly connected to the lifting bracket 807. By reference to Figure 25 it is apparent that the slot C formed in the bottom portion of this head 807 extends downwardly over the peeling head shaft 606 to stop any side movement which may cause a binding action in the peeling pad stems 810 hereafter described. A roller bearing 812 is slidably mounted upon the rod 806 by means of adjusting nuts 812A and 812B and which adjusting nuts hold the bearing in adjusted position. The key 812C in the rod 806 and the keyway 812D in the roller bearing 812 keep this roller bearing sleeve 812 on the rod 806 from turning. A horizontal arm 813 on this roller bearing sleeve 812 extends laterally and carries the roller 814.

Peeling pad guide blocks 809 in certain positions rest upon the top of the pad lift bracket 807. These guide blocks are fastened to the peeling pad stems 810 by pilot screws 811 and guide pins 827 are screwed into the bracket or lifting head 807, to prevent the peeling pad stems 810 from turning. As shown more clearly in Figure 26 the bracket 815 carries a spring adjusting screw 817 and also carries a spring collar 818 and a spring 816 which rest upon the guide block 809 to exert pressure upon the peeling pad 821. Mounted upon the bearings of the bracket 815 is a shaft 819 and mounted upon this shaft 819 is a lift lever 820. The details of construction of the peeling pad assembly are shown in Figures 29 to 32 inclusive. This assembly includes a knock-out pad or member 822 and knock-out pad spring 823, a spring plate 824 and peeling pad stem 810. The upper end of each peeling pad stem 810 is bored as at 810L (see Figure 29) to receive the point of the screw 811 of the guide block 809. The lower end of each one of these peeling pad stems 810 is slotted as at 809K to receive the lock spring 826. The cross pin 825 is grooved as at 825H for the spring 826 which locks the pin 825 in place. In changing the peeling pads the pin 825 is first removed in which case the main peeling pad 821 may be removed and a larger or smaller peeling pad substituted therefor.

As shown in Figure 26 the bracket 807 is supported by the rod 806, a perspective view of this bracket 807 is seen in Figure 29. The guide block 809 rests upon this bracket 807 and supports the peeling pad stem 810. As before stated this bracket 807 carries two standing guide pins 827 which guide the movement of the brackets 809 in a true vertical direction.

By reference to Figure 29 again the peeling pad carries two upstanding spaced apart lugs 821A and 821B between which is mounted a block 810A supported upon the lower end of each of the peeling pad stems 810. The block 810A has parallel sides to fit between the space between the two guide blocks 821A and 821B of the peeling pad 821. The pin 825 heretofore described passes through registering apertures in the ears 821A and 821B and through the block 810A on the bottom of the stem 810 whereby detachably to unite the peeling pad 821 to each peeling pad stem 810 and also to form a pivotal connection between the peeling pad and the peeling pad stem so that the pad may adjust itself to any irregularities on the surface of the pear. In addition, as heretofore described the block 810A on the bottom of each peeling pad stem 810 is provided with a vertical bore 810C to receive the thimble or pad 822 within which is housed the compression spring 822A the upper end of which bears against the cover plate 824 by means of which construction the bottom of the thimble or pad 822 is normally forced downwardly or outwardly in advance of the bottom surface of the main pad 821. In order to prevent the knock-out pad 822 from being pushed out too far, outwardly bent annular shoulders are formed on the upper end of this thimble or pad 822 to check against inwardly formed shoulders on the bore of the block 810A. The foregoing construction provides a very simplified arrangement for manufacturing and arranging the knock-out pad 822 with relation to each main peeling pad stem 810 and also with reference to the main pad 821 which as shown is provided with an opening 821C through which this knock-out pad is adapted to project. In certain instances when the peeling head is lowered into contact with the face of the pear as shown in Figure 26, the contact with the pear will force the knock-out pad 822 upwardly into the bore in the block 810A so that the faces of the knock-out pad 822 and the end face of the main pad 821 are in the same plane.

Normally the spring 822A forces the knock-out pad 822 downwardly in advance of the end surface of the main pad 821.

In general when the peeling knife has finished its cutting movement, the peeling head 638 raises upwardly until the top of the boss 639 on the peeling head 638 comes in contact with the bottom of the guide block 809 (see Figures 34 and 40). The peeling pad 821 being down, and the peeling knife being at this time on the finished side of the peeling movement, it is necessary to raise the peeling pad 821 relatively close to the peeling knife so that the peeling knife 636 can rotate clockwise back to its starting position (see Figure 41). Mounted upon the shaft 819 as hereinbefore described is the lever 820A the opposite end of which extends outwardly in contact with the roller 814. The opposite end of the lever 820 is disposed in the path of the roller 805 mounted upon the bracket 808 as hereinbefore described. Figure 2 shows that the peeling head has lowered about 1½" to the position where it rests upon the adjustable stop screws 609. Therefore the present pear constructional details cooperate because the power operated vertically reciprocated peeling head 638 rigidly carries with it the bearing support 815 carrying the operating lever 820. The left hand outer end of the lever cooperates with the roller 814 on the lifting stem 806 which carries the peeling pad lifting yoke 807. Always mounted above the peeling pad lifting yoke 807 but shiftable relatively to the peeling pad lifting block are the two guide blocks 809. Each one of these blocks is rigidly mounted and connected to the top portion of the peeling pad stems 810. By means of this construction when the peeling head rises and with it carries the peeling knives away from the cut face of the fruit in the stationary cup, the vertical bracket 815 rigidly carried by the peeling head likewise rises and this causes through the intermediary of the lever 820 and through the action of the right hand end 820B of this lever contacting the roller 805 which is stationary, and further causes the rising of the left hand end 820A of this lever. This end of the lever causing the contact of roller 814 and the stem 806, raises the stem. The lower end of the rod 806 carries the peeling pad lifting yoke 807 which, in turn, raises the peeling pad guide blocks 809 which are fastened to the upper ends of the peeling pad stems 810 whereby the peeling head moves up at one rate of speed to remove the knife from the cut face of the fruit, and after the lever 820 strikes the roller 805 the peeling pads are given a faster upward movement to withdraw the peeling pads away from the cut face of the half fruit and bring them in to the zone shown in Figure 41 so that by the time they reach their uppermost travel (shown in Figure 41) the bottom level of these pads is substantially at the axis of turning X of the peeling knives 636 so that the knives can subsequently turn clockwise to return them to starting position (shown in Figure 36). The arrangement of the lever 820 with its cam means 820B and its opposite end, together with the disposition of the roller 814 on the stem 806, as well as the action of the spring 816 tending constantly to force the guide blocks 809 downwardly is such that the peeling pads 821 are maintained down upon the cut face of the half fruit as shown in Figures 35 and 38, until after the completion of the peeling cut and particularly until after the peeling head has risen sufficiently high as shown somewhere between the positions shown in Figures 40 and 41 wherein the peeling knife moves upwardly away from the face of the half fruit while the pad is still held in contact with the cut face of the half fruit. At this point in the operation, the peeling knife will have moved up sufficiently far and away above the pad so that any entangled peeling interconnecting the upwardly traveling knife and the half fruit will be ruptured by the relative separation between the upwardly moving knife and the cut fruit still held down in the cup by means of the peeling pad 821. After this severance the peeling pad then moves quickly upwardly as hereinbefore described to the position shown in Figure 41.

With further reference to Figures 47 to 52, you will note that in Figure 47 there is a gap of $\frac{1}{16}''$ between the lifting yoke 807 and the guide block 809. When the peeling pad 821 is resting upon the cut face of the half pear, this $\frac{1}{16}''$ is provided to assure that the peeling pad 821 rests on the cut face of the fruit firmly when the fruit is small. Figure 48 shows a construction using the larger size of pear wherein the bottom face of the peeling pad 821 coincides with the axis X about which the peeling knife 636 swings. With reference to Figure 47 in peeling the smallest pear, in order to get a uniform thickness of peeling removed from the fruit, the knife 636 must swing a predetermined distance from the inner wall of the stationary cup section, the cup sections being concentric in this instance. This distance is usually about $\frac{3}{32}''$ which means that the radius R (see Figure 47) must coincide with a smaller radius about which the knife 636 swings. The pad however in this case is $\frac{1}{8}''$ below the center X of turning of the knife (see Figure 47) and if there were no pear in the cup, the $\frac{1}{16}''$ gap between the peeling pad lifting yoke 807 and the upper edge of the boss 639 on the peeling head would be closed and the under side of the peeling pad 821 would lie $\frac{3}{16}''$ below the center line X about which the peeling knife swings, which would be the position shown in Figures 47 and 48 and would occur when the peeling head is down in peeling position.

Certain additional changes have been made on the cup structure and operating mechanism of the pear machine as distinguished from the old style of side pusher operator shown in Figure 9 of Ewald Patent 2,242,243, and Ewald Patent 2,255,049. The changes shown in Figures 42 to 46 of the present application incorporate structural features so that the side pusher trigger of the fruit cups can be properly adjusted to take care of wear. I shall describe the construction of the pear cup with relation to its modification to accomplish the improved functions for processing pears. As here shown each fruit holder is composed of two substantially identical sections, one a stationary cup section 924A which embodies a cup wall 925 with a steam 926 depending downwardly therefrom, as clearly shown in Figure 44 herein, and also in Figure 6 of Ewald Patent 2,255,049. This stem is provided with a vertical slot 927 herein which is the same as slot 28 in Ewald Patent 2,255,049, and is bolted as at 927A to the turret 158. The purpose of this slot 927 is to facilitate the removal and replacement of the different size fruit cups on and from the turret irrespective of the size of the fruit cups, the distance from the seat to the center line of the cup which is also the center line of the axis about which the peeling knife swings, remains the same so that when a cup is placed on the turret in the manner hereinbefore indicated, the peeling knife will reach a selected distance from the cup bottom. In the right side of the stem 926 is a bearing portion such as shown at 31 in Figure 6 of Ewald Patent 2,255,049 and which is shown at 926A herein, see Figure 44 herein, which portion is drilled for the insertion of a stud shaft or hinge pin 932.

The movable element 935 of the cup and which includes the cup wall 937 has depending therefrom two journal members 935A and 936 at the back and front side thereof, see Figure 44, which members are disposed at opposite sides of the enlarged portion 926A of the stem and these journals 935A and 936 receive the stub shaft or hinge pin 932. The cup walls 937 of the movable cup section 935 are thus capable of being moved toward and away from the cup walls 925 by pivoting about the journals mounted on the stub shaft.

Extending downwardly from shiftable peeling head base 638 at opposite sides of the shaft 606, see Figure 25, are brackets 638a, see Figure 7. The bottom portion of these brackets 638a are extended at right angles laterally and again upwardly to form a journalled section 638b. Aligned within these brackets and in the journalled sections are bearings for shafts 624 and 626. Intermediate the journalled sections 638a and 638b and the brackets 638a are recesses for the accommodation of gears 620 and 622, see Figures 7, 25 and 44. These gears are keyed to their respective shafts. The shafts are of equal radii from the main central shaft 606 so that the segmental gear 618, see Figures 7, 25 and 44, may engage the gears 620 and 622.

There are placed upon the shafts 624 and 626 adjacent to the inner faces of the brackets, circular cams 622a. To the extreme inner ends of the shafts 624 and 626 are attached blocks 628 and 630 in a nonrotative manner and to which in turn are attached the ends of the peeling blade 636, see Figure 12 herein specifically disclosed as a pear peeling blade. The peeling blade is preferably constructed in accordance with Patent 2,060,802 dated November 17, 1936.

As before stated, the bearing mechanism or bearing head which cooperates with the fruit cups as they arrive at the peeling station, is mounted upon the vertically slidable yoke 586, see Figure 25, which is adapted for reciprocation within a vertical plane just to the front of the frame upright members. (See Figure 1 and the description thereof.)

Secured to the bottoms of the brackets 966, see Figure 44, by means of bolts are brackets 966a in which there are threaded apertures 966b for the reception of bolts 980. These bolts 980 are threaded into the apertures on the back sides of the brackets and have journalled on to shanks thereof, sleeves 984. Projecting to the right from the sleeves 984 are fingers 986 with notches formed within the lower extended part thereof for engagement of the loop end of a spring 988. The bracket 985 depends downwardly as shown in Figure 46 and carries a generally rectangular portion 990 which is provided with an elongated slot 992 which is for purposes of adjustment, as will now be described.

Cooperating with this elongated slot like portion 992 is plate 994 shown in Figure 45, provided with a pair of spaced apart threaded openings 996 for the reception of bolts 998 threaded through the openings 996 and through slot 992 of the bracket 985 whereby the plate like member 994 may be held in various adjusted positions with respect to the slotted bracket 985. Member 985 is provided with a relatively long depending trigger like cam 1000 which, upon vertical reciprocation of the peeling head upon which it is mounted, as is hereinbefore described, operated to wipe against a roller 1002 rotatably mounted upon the lower end of an arm 1004, in turn pivotally supported upon pin 932, see Figures 42, 43 and 44, which last pin 932 forms the pivotal interconnection between the stationary cup section 925 and the relatively movable cup section 935.

In accordance with the foregoing construction, as the different parts wear, the trigger like cam 1000 becomes positioned too far away on the roller 1002 so that the action of the cam lever 1000 cannot act properly on the roller 1002. In order to take up this adjustment, bolts 998 are loosened and the trigger cam 1000 is set the proper distance away from this roller 1002.

The foregoing adjustment constitutes the main constructional variance in the cup mechanism over the cup mechanism shown and described in the various patents assigned to Special Equipment Company, specifically the Ewald Patent 2,255,259, or of the cup construction shown in my prior application 507,255, filed October 22, 1943, and of which the present application forms a continuation in part.

Referring further to the constructional details of Figures 26 and 29, it is to be seen that the recesses or spaces 814A and 814B of the peeling pad lifter are provided so that at certain times the peeling pad lifter 807 can pass down around the two bosses 639 on a peeling head (see Figure 26). Furthermore, by reason of the vertically upstanding pins 827 on the peeling head lifter slidingly engaging within the walls 118 of the peeling pad lifter guide blocks, these pins act as guides so that the peeling pad will always be held in alignment with the peeling knife in various vertically shifted positions of the relative parts. It will also be seen that the furcations 807A on the peeling pad lifting member 807, engaging the shaft 606 (see Figure 25) provide means to keep the lifting pad assembly in alignment so that if one peeling pad tends to make the lift heavier than the other the assembly will not be cocked to one side or the other thereby causing an objectionable binding of the parts.

With reference now to the figures of the drawings showing the various positions of the parts in the operation of the device, and referring to Figure 36, this figure shows the peeling head in its raised position. Here the peeling pads 821, only one being shown, are in the up position; they have been lifted with respect to the peeling head to the center line or axis X about which the peeling knife 636 swings. The peeling knife 636 in this position has swung or returned in a clockwise direction to its starting position. Knock-out pad 822 is shown as being normally spring pressed downwardly below the lower face of the peeling pad 821. Figure 37 shows the peeling head lowered until the knock-out pad 822 has touched the upper cut face of the half fruit. In this position the center line X of the peeling knife has lagged behind the lowering of the peeling pad as hereinafter more fully explained. Figure 38 shows the peeling pad 821 in contact with the cut face of the fruit and holding the half fruit in this manner from turning in the cup. The knock-out pad has been pushed upwardly into the peeling pad stem lower boss 810A and the peeling knife center line X which is always on the cutting edge of the knife, is positioned concentric with the inner wall of the stationary section 925 of the cup (see Figures 25 and 46). In this view, the axis of the peeling knife is on the upper face of the half fruit.

Figure 39 shows that part of the operation in the movements of the part wherein the peeling knife 636 has completed its cut through the half fruit to sever the peeling from the pear. Figure 40 shows a successive view wherein the peeling knife 636 has been raised about ¾″ while the peeling pad 821 is still holding down the half fruit in the cup. Figure 41 shows the position wherein the peeling head 638 has moved up with the peeling knife center line X to position this center line X in the bottom plane of the pad so that the peeling knife 636 can swing in clockwise direction back to its starting position shown in Figure 36.

Now in order to explain more fully the functions of the mechanism of this present invention, I shall refer to Figures 33 to 35 inclusive. In this series of figures, Figure 33 shows the peeling head 638 in the up or raised position, the peeling knife 636 being shown as swung back in a clockwise direction to its starting position in the manner shown in Figure 36. Figure 34 shows the position of the parts where the peeling head has lowered about 1½″ to a position where the peeling pad lifter guide block 809 rests on the top surface of the boss 639 of the peeling head assembly. In Figure 10 of this application the boss 639 corresponds to the boss 639 of the peeling head 638. Figure 35 shows the peeling head 638 down in peeling position and the axis X of the peeling knife 636 concentric with the inner walls of the peeling cup (see Figure 38).

Referring now more particularly to Figure 33, the peeling knife in this view is being swung clockwise back to its starting position and the peeling pad is being held up in elevated position so that the knife can swing clear of the pad during the clockwise turning of the peeling knife back to its starting position. As the peeling head 638 now starts to move downward, the action of the lever 820 and the rollers 805 and 814 is such that the peeling pad 821 with the supporting stem 806 lowers faster than the peeling head until the guide block 809 rests upon the boss 639 of the peeling head as shown in Figure 34. The stem 806 and the peeling pad lifter yoke lower down past the guide block 809 and come to rest about ¾″ below the guide block 809. The stem 806 with the peeling pad lifter yoke 807 is now dependently supported by the lock nuts 806A and 806B which rest on the bracket 801. The peeling pad 821 now lowers with the peeling head 638 until the lower face Y shown in Figure 35 of the guide block 809 is spaced from the upper face of the peeling pad lifter yoke 807 a distance of from $\frac{1}{16}$″ to $\frac{3}{16}$″ depending on the size of the pear (see Figures 35, 47 and 48). When this occurs, the peeling pad 821 has been positioned for peeling and while this is taking place the peeling knife center line X has also been positioned for peeling. This position is shown in Figure 35. During the time that the mechanism is in position as shown in Figure 35, the peeling knife swings through its peeling swing or cut. After the completion of the peeling cut the peeling head 638 starts to raise. The peeling pad 821 will now remain on the face of the fruit while the peeling head 638 and the peeling knife 636 raise until the face 820B of the lever 820 strikes the roller 805. Now since the lever 820 is pivoted on the upwardly moving shaft 819 and since the roller 805 is stationary and because the opposite end 820A of the lever 820 is contacting the roller 814, and due to the fact that this roller 814 is secured to the stem 806 through the connection 814A heretofore described, and since the peeling pad lifting yoke 807 is underlying the guide blocks 809 of the peeling pad stems, the peeling pads 821 will be raised at a greater speed than the peeling head is raised. The peeling pads 821 will thus catch up with the raising movement of the peeling head 638 and will assume their proper positions as shown in Figure 33.

In the lowering of the peeling head the action, as explained above, refers to the figures in the sequence of Figures 33, 34 and 35 while when the peeling head is raised, the action is in the reverse or in the sequence of Figures 35, 34 and 33. In other words, when the peeling head is lowering the peeling pad 821 reaches the fruit ahead of the peeling knife center line by ¾" while when the peeling head 638 raises, the peeling pad 821 lags behind the raising of the peeling knife center line by ¾".

The present mechanism just described is in no wise shown in the Ewald Patent 2,242,243. In such patent when the peeling head is in the down position and there is no fruit in the cup, the under side of the peeling pad is about $\frac{3}{16}$" below the center of turning of the knife. When there is fruit in the cup theoretically the under side of the pad can be from ⅛" below the turning of the center of the peeling knife to zero as would occur between Figures 10 and 11 of sheet 6 of said patent.

With respect to the Ewald Patent 2,242,243, referring to Figures 10 to 15, there is a discrepancy in these figures with respect to the peeling knife. These figures show the peeling knife swinging about a center which is in the center of the blade that is mid-way between the cutting edge of the heel. The center of turning of the knife actually is directly in line with the cutting edge and should have been thus shown in Figures 10 to 15 of the Ewald Patent 2,242,243, which figures were added to the application upon which said patent was issued after the filing of the application and in response to a requirement of the examiner for further illustration of the invention.

The present invention is a continuation in part of my prior filed application No. 507,255, filed October 22, 1943, which has become abandoned.

This invention is hereby claimed as follows:

1. In a fruit treating apparatus, in combination with fruit holding means for holding a half fruit with its cut face exposed and with the longitudinal axis of its seed section disposed in a predetermined direction in the holder, an arcuate peeling blade adapted to be juxtaposed to the cut face of the half fruit and with the peeling blade axis lying parallel to the longitudinal axis of the seed section of the half fruit, means for arcuately moving the blade through the flesh of the half fruit to peel the same, means for relatively moving the half fruit holding means and the peeling blade between a juxtaposed peeling position and a remote position, auxiliary fruit holding means disposed to contact the cut face of the half fruit during the peeling operation to maintain the peeling position of the half fruit in its fruit holding means, means for maintaining the auxiliary fruit holding means in contact with the cut face of the half fruit until the peeling blade and fruit holding means have been moved relatively apart sufficiently to prevent peeling unsevered from the half fruit in the fruit holding means entangling with the peeling blade and pulling the half fruit out of its fruit holding means and means thereafter operative in timed relation with the relative movement of the peeling blade and the fruit holding means for moving the auxiliary fruit holding means out of contact with the cut face of the half fruit.

2. In a fruit treating apparatus, in combination with fruit holding means for holding a half fruit with its cut face exposed, peeling means adapted arcuately to move through the flesh of the half fruit to peel the same, power actuated means for relatively moving the fruit holding means and the peeling means into juxtaposed peeling position or to separated position, means for arcuately moving the peeling means when the first holding means and peeling means are juxtaposed, auxiliary fruit holding means having a portion adapted to contact the cut face of the half fruit, means for maintaining said auxiliary fruit holding means in contact with the cut face of the half fruit during peeling and thereafter until the peeling means and fruit holding means have been relatively separated sufficiently to rupture any peeling interconnecting the half fruit and the peeling means and power operated means for thereafter relatively moving the cut face of the half fruit in the fruit holding means and the auxiliary fruit holding means out of contact and the peeling means and auxiliary friut holding means relatively toward each other.

3. In a fruit treating apparatus, in combination with fruit holding means for holding a half fruit with its cut face exposed, peeling means, means for actuating the peeling means to pare the fruit, means for relatively shifting the holding means and peeling means toward each other to position the half fruit for peeling by said peeling means and away from each other on completion of the peeling of the half fruit by said peeling means, auxiliary fruit holding means relatively shiftable with respect to the fruit holding means, spring means for maintaining the auxiliary fruit holding means in contact with the cut face of the half fruit to hold the half fruit therein until the first-mentioned holding means and peeling means have been separated sufficiently to cause skin unsevered from the flesh of the half fruit and entangled with the peeling means to be ruptured or cut, and power actuated means thereafter operative for compressing said spring means and for withdrawing the auxiliary fruit holding means from the cut face of the fruit and for moving said auxiliary fruit holding means adjacent said peeling means and mechanism operative arcuately to return said peeling means back to initial peeling position while said auxiliary fruit holding means is positioned adjacent said peeling means.

4. In a device of the class described, in combination with fruit holding means for holding a half fruit with its cut face exposed, a peeling head adapted to lie adjacent the cut face of the half fruit or remote therefrom, a peeling knife mounted on the peeling head and adapted in said adjacent position of the peeling head arcuately to move through the flesh of the half fruit to peel the same, a peeling pad carried by the peeling head and adapted in such adjacent position of the peeling head to contact the cut face of the half fruit, means for relatively separating the peeling knife from the cut face of the half fruit in the holding means while maintaining the peeling pad in contact with the cut face of the half fruit, and means for thereafter relatively shifting the holding means and peeling pad to position the peeling pad away from the cut face of the half fruit, whereby to preclude peeling entangling with the peeling knife from shifting the half fruit from its fruit holding means.

5. In a device of the class described, in combination with means for holding a half fruit with its cut face exposed, a peeling head relatively shiftable to and fro with respect to said holding means between a position remote from the cut face of the half fruit and a position adjacent the cut face of the half fruit, a peeling knife carried by the peeling head, means for arcuately shifting the peeling knife through the flesh of the half fruit when the peeling is adjacent the holding means to effect the peeling operation, auxiliary half fruit holding means carried by the peeling head and adapted to contact the cut face of the half fruit during the peeling operation, means for maintaining the auxiliary half fruit holding means in contact with the cut face of the half fruit during the initial portion of the relative separating movement of the peeling head and the first mentioned holding means, whereby to cause the peeling knife as it moves away relatively from the half fruit held by said auxiliary half fruit holding means to either sever or rupture skin of the half fruit entangled with the peeling knife, and mechanism for causing the auxiliary half fruit holding means subsequently relatively to withdraw from the cut face of the half fruit.

6. In a device of the class described, in combination with means for holding a half fruit with its cut face exposed, a peeling head, means for relatively shifting the fruit holding means and peeling head from a position wherein the peeling head is relatively remote from the cut face of the half fruit to a position adjacent the same, a peeling knife mounted on the peeling head, power actuated means for arcuately swinging the peeling knife through the flesh of the half fruit to peel the same, a carriage shiftably mounted on the peeling head, a peeling pad mounted on said carriage, spring means tending to shift said peeling pad into contact with the cut face of the half fruit whereby when the peeling head is in position adjacent the cut face of the half fruit said peeling pad will engage the cut face of the half fruit to hold the half fruit in proper peeling position, and means on said peeling head and operative as the fruit holding means and peeling head move relatively away from the cut face of the half fruit for holding the peeling pad into contact with the cut face of the half fruit until the peeling knife has relatively moved sufficiently away from the cut face of the half fruit so as to cause peeling connected with the half fruit and entangled with the peeling knife to be ruptured or to be severed by the relative departing movement of the peeling knife away from the cut face of the half fruit and power operated means for shifting the peeling pad toward said peeling knife as said peeling knife moves away from the fruit holding means and at a rate of movement faster than the movement of the peeling means.

7. In a device of the class described, in combination with means for holding a half fruit with its cut face exposed, a peeling head shiftable relatively to said holding means from a position remote from the cut face of the half fruit to a position adjacent the cut face of the half fruit, a peeling knife mounted on the peeling head for swinging movement whereby arcuately to cut through the flesh of the fruit when the peeling head is positioned adjacent the half fruit, supporting means on the peeling head, a peeling pad having a stem provided with a lateral projection, spring means tending normally to press the peeling pad into yielding contact with the cut face of the half fruit when the peeling head is adjacent the cut face of the half fruit, an actuatable shaft on said peeling head, a rocker arm on said shaft adapted to engage the projections on said stem, cam means mounted on said machine, said rocker arm having a lateral arm provided with a roller adapted to engage said cam means whereby on predetermined relative movement between said peeling head and said cam means said roller is actuated to cause the rocker arm to permit the spring to maintain said peeling pad in contact with the cut face of the half fruit until sufficient relative rise of the peeling head and peeling knife relatively away from the cut face of the half fruit, said cam thereafter shifting said rocker arm to raise the peeling pad relatively to the peeling head and relatively to the cut face of the half fruit to remove the peeling pad from the cut face of the half fruit.

8. In an apparatus for cutting pitted half peaches having pit cavities, the combination of a holder adapted to receive a pitted half peach with its cut face exposed, additional half peach holding means having substantially flat faces adapted yieldingly to contact the flat or cut face of the half peach at zones surrounding the pit cavity thereof, and a knock-out pad having a substantially flat face adapted to contact the cut face of the half peach in straddling relation to the pit cavity and of substantially the same dimension in such direction as said additional half peach holding means, means for normally maintaining the knock-out pad with its flat face in advance of the flat face of the main pad, said knock-out pad being mounted for movement relative to said additional half peach holding means on contact with the half peach to position the flat face of the peach in the plane of the flat face of the additional half peach holding means.

9. In an apparatus for cutting half peaches, the combination of a half peach holder adapted to receive a pitted half peach with its flat cut face exposed, peeling means adapted arcuately to cut through the flesh of the peach to peel the same, auxiliary means for holding the peach in its holder during the peeling operation and having flat face portions adapted to engage the cut face of the half fruit laterally of the pit cavity, and a knock-out pad having a flat face portion likewise engaging the cut face of the half fruit at portions laterally of the pit cavity and extending in a direction normal to the longitudinal pit cavity axis for a distance substantially equal to the lateral dimension of said auxiliary holding means in such direction and spring means for normally maintaining the knock-out pad in advance of the plane of the auxiliary holding means and yieldable to permit the flat face of the knock-out pad to lie flush with the plane of the flat face auxiliary holding means when both pads are in contact with the cut face of the half fruit.

10. In an apparatus for cutting half fruit, the combination of a holder adapted to receive the half fruit with its pitted, cut face exposed, a main pad having a central countersunk portion and recesses extending diametrically thereof, a suction breaking or knock-out pad having a central portion adapted to lie in the countersunk portion of the main pad and having portions lying in the diametrically extending recesses, said portions engaging with the cut face of the half fruit laterally of the pit cavity and extending in a direction normal to the longitudinal axis of the pit cavity, spring means operative normally to project the plane of the knock-out pad in advance of the plane of the main pad while permitting the plane of the knock-out pad to lie flush with the plane of the main pad.

11. In a device for peeling half fruit, the combination of a half fruit holder adapted to hold a half fruit with its cut face exposed, a peeling head reciprocable relatively to the half fruit holder from a position remote therefrom to a position adjacent the cut face of the half fruit in the half fruit holder, a peeling knife on the head actuatable arcuately to move through the flesh of the fruit to peel the same, a peeling pad mounted on the head and engageable with the cut face of the half fruit to hold the half fruit in peeling position within the half fruit holder and peel stripping means mounted on said peeling pad and adapted to strip the peeling from the peeling knife after the peeling knife has completed its peeling operation.

12. In a device for peeling half fruit, the combination of a half fruit holder adapted to hold a half fruit with its cut face exposed, a peeling head reciprocable relatively to the half fruit holder from a position remote therefrom to a position adjacent the cut face of the half fruit in the half fruit holder, a peeling knife on the head actuatable arcuately to move through the flesh of the fruit to peel the same, a peeling pad mounted on the head and engageable with the cut face of the half fruit to hold the half fruit in peeling position within the half fruit holder, and peel stripping means mounted on said peeling pad and adapted to strip the peeling from the peeling knife after the peeling knife has completed its peeling operation, said stripping means lying outside of the path of action of the peeling blade as the latter emerges from its cutting movement through the half fruit, whereby to strip peeling from the peeling knife.

13. A construction in accordance with claim 11 wherein the pad mechanism is mounted in the bottom of a tube, and wherein the stripping means is mounted on the tube, and wherein during the relative movement between the peeling cutter and the pad the stripping mechanism passes outside of the peeling knife to strip the peel therefrom.

14. In a fruit treating apparatus, in combination with fruit holding means for holding a half fruit with its cut face exposed, peeling means adapted arcuately to move through the flesh of the half fruit to peel the same, power actuated means for relatively moving the fruit holding means and the peeling means into juxtaposed peeling position or to separated position and for arcuately moving the peeling means through the flesh of the half fruit held in the holding means to peel the half fruit, auxiliary fruit holding means having a portion adapted to contact the cut face of the half fruit, and means for maintaining said auxiliary fruit holding means in contact with the cut face of the half fruit during peeling and thereafter until the peeling means and fruit holding means have been relatively separated sufficiently to rupture any peeling interconnecting the half fruit and the peeling means, and means operable in timed relation to the relative separation of the peeling means and fruit holding means for thereafter moving the auxiliary fruit holding means out of contact with the cut face of the half fruit.

15. In an apparatus for cutting half fruit, the combination of holding means adapted to receive and hold a half fruit with its cut face exposed, auxiliary half fruit holding means having a substantially flat face adapted yieldingly to contact the flat or cut face of the half fruit, said flat face having a recessed portion extending substantially diametrically thereacross substantially to the peripheral edges thereof, and a knock-out pad having a substantially flat face adapted to lie in said recess substantially the length thereof, and resilient means for normally pressing said knock-out pad out of the plane of said auxiliary fruit holding means, said knock-out pad when said auxiliary fruit holding means and knock-out pad contact the cut face of the half fruit nesting in said recess with its contacting face lying in the plane of the contacting face of the auxiliary holding means and means on said knock-out pad to prevent turning thereof relative to said auxiliary half fruit holding means.

16. In a half fruit processing device, the combination of a cup-shaped holder for holding a half fruit with its cut face exposed and with the seed section removed therefrom leaving a seed cavity therein, said holder including relatively shiftable parts shiftable to permit the half fruit to shift laterally in a predetermined direction with respect to the internal walls of said holder to effect correct peeling, peeling means shiftable arcuately through the flesh of the half fruit to peel the same and to cause the half fruit to shift laterally relatively to the inner walls of the cup-shaped holder during the peeling action, auxiliary fruit holding means adapted to contact the cut face of the half fruit, means for causing the auxiliary fruit holding means to press against the cut face of the half fruit during the peeling operation, said auxiliary fruit holding means directly overlying the locus of the seed section of the half fruit and having lateral extensions projecting in the direction of lateral movement of the half fruit in the fruit holding means, said extensions projecting well beyond the locus of the seed section and adapted to contact the cut flesh of the half fruit in any shifted position of the half fruit relative to the fruit holding means.

17. In a fruit treating apparatus, in combination with fruit holding means for holding a half fruit with its cut face exposed, peeling means adapted arcuately to move through the flesh of the half fruit to peel the same while held in the cup, means for relatively moving the fruit holding means and the peeling means into juxtaposed position and into a position wherein the same are separated, and means operable in timed relation with the relative separation of the peeling means and the fruit holding means to sever peel entangled with the peeling means.

18. In a device for peeling half fruit, the combination of fruit holding means adapted to hold a half fruit with its cut face exposed, peeling means adapted arcuately to move through the flesh of the half fruit to peel the same, means for producing relative movement between the fruit holding means and the peeling means whereby the peeling means and cut face of the half fruit are positioned adjacently or are separated one from the other, and peel stripping means operable upon relative separation of the fruit holding means and peeling means for stripping the peeling from the peeling means after the peeling operation.

19. In a fruit processing machine, the combination of a support, half fruit holding means mounted on said support for receiving and holding half fruits with their cut faces exposed, a peeling head shiftably mounted on said support, power actuated means for shifting said peeling head toward and from said half fruit holding means, peeling means mounted on said support for arcuate movement, mechanism driven by said power actuated means for arcuately shifting the peeling means when said peeling means is positioned adjacent the cut face of the half fruit for cutting into the cut face of the half fruit and for arcuately swinging through the flesh of the half fruit to peel the same, said mechanism being operative when said peeling head is shifted to a position remote from the cut face of the half fruit held in said fruit holding means for reversely and arcuately shifting the peeling means back to initial peeling position, auxiliary fruit holding means shiftably mounted upon said peeling head, spring means mounted on said peeling head and operable resiliently to press said auxiliary fruit holding means into contact with the cut face of the half fruit during at least a portion of the peeling operation and power actuated mechanism operatively associated with said peeling head for maintaining said auxiliary fruit holding means in contact with the cut face of the half fruit after completion of the peeling operation and after movement of the peeling head away from the cut face of the half fruit held in said fruit holding means whereby to sever peeling entangled between the half fruit and the peeling means, said last mentioned power actuated mechanism including devices for thereafter shifting the auxiliary fruit holding means relatively quickly out of contact with the cut face of the half fruit and for positioning the same sufficiently close to the peeling means so that upon the aforesaid return arcuate movement of the peeling means back to initial peeling position said peeling means will clear said auxiliary fruit holding means.

20. A device for processing half fruits, the combination of a support, a pair of fruit holding means each for receiving and holding a half fruit with its cut face exposed, a peeling head shiftably mounted on said support, a power means, mechanism operated by said power means for so shifting said peeling head, a pair of peeling knives arcuately mounted on said peeling head for shifting movement and operable to cut into the cut faces and to cut through the flesh of the half fruit to peel the same when the peeling head is positioned adjacent the half fruit holding means, a pair of fruit holding pads shiftably mounted on said peeling head, spring means associated with each peeling pad for normally pressing the same toward the cut face of the half fruit so that during the peeling operation each of said pads will be maintained in pressing contact with the cut face of the half fruit, cam means disposed in the path of travel of the shiftable peeling head, lever means shiftably mounted on said peeling head and operable by said cam means upon relative movement of said head and cam means for actuating said lever means for power lifting each of said peeling pads against the tension of its spring, said cam and lever means being constructed and arranged to delay the lifting of each peeling pad from the cut faces of the half fruit until sufficiently long after the raising of the peeling knives away from the cut face of the half fruit after the peeling operation so that peeling entangled between the half fruit and the peeling knives will be severed by said movement of separation of said peeling knives and the half fruit detained in the half fruit holders by said peeling pads.

21. A device for processing half fruits, the combination of a support, a pair of fruit holding means each for receiving and holding a half fruit with its cut face exposed, a peeling head shiftably mounted on said support, a power means, mechanism operated by said power means for so shifting said peeling head, a pair of peeling knives arcuately mounted on said peeling head for shifting movement and operable to cut into the cut faces and to cut through the flesh of the half fruit to peel the same when the peeling head is positioned adjacent the half fruit holding means, a pair of fruit holding pads shiftably mounted on said peeling head, spring means associated with each peeling pad for normally pressing the same toward the cut face of the half fruit so that during the peeling operation each of said pads will be maintained in pressing contact with the cut face of the half fruit, cam means disposed in the path of travel of the shiftable peeling head, lever means shiftably mounted on said peeling head and operable by said cam means upon relative movement of said head and cam means for actuating said lever means for power lifting each of said peeling pads against the tension of its spring, said cam and lever means being constructed and aranged to delay the lifting of each peeling pad from the cut face of the half fruit until sufficiently long after the raising of the peeling knives away from the cut faces of the half fruit after the peeling operation so that peeling entangled between the half fruit and peeling knives will be severed by said movement of separation of said peeling knives and the half fruit detained in the half fruit holders by said peeling pads, said cam means and lever means including mechanism operable upon said peeling pads for quickly shifting the same upwardly into a position such that the bottom faces of the peeling pads are substantially in a common plane with the axes of turning of said peeling knives when the peeling knives are remotely positioned from the cut faces of the half fruit.

22. A device for processing half fruits, the combination of a support, a pair of fruit holding means each for receiving and holding a half fruit with its cut face exposed, a peeling head shiftably mounted on said support, a power means, mechanism operated by said power means for so shifting said peeling head, a pair of peeling knives arcuately mounted on said peeling head for shifting movement and operable to cut into the cut faces and to cut through the flesh of the half fruit to peel the same when the peeling head is positioned adjacent the half fruit holding means, a pair of fruit holding pads shiftably mounted on said peeling head, spring means associated with each peeling pad for normally pressing the same toward the cut face of the half fruit so that during the peeling operation each of said pads will be maintained in pressing contact with the cut face of the half fruit, cam means disposed in the path of travel of the shiftable peeling head, lever means shiftably mounted on said peeling head and operable by said cam means upon relative movement of said head and cam means for actuating said lever means for power lifting each of said peeling pads against the tension of its spring, said cam and lever means being constructed and arranged to delay the lifting of said peeling pads from the cut faces of the half fruit until sufficiently long after the raising of the peeling knives away from the cut faces of the half fruit after the peeling operation so that peeling entangled between the half fruit and peeling knives will be severed by said movement of separation of said peeling knives and the half fruit detained in the half fruit holders by said peeling pads, and mechanism operated with the movement of said peeling pads to prevent the tilting of said peeling pads one with respect to the other.

23. A peeling pad structure for a fruit processing machine comprising a peeling pad stem having an enlarged foot at its bottom portion, said foot being provided with a pair of parallel spaced apart surfaces, a peeling pad having a pair of upstanding ears and adapted to fit said upstanding surfaces, a pin passing through registering holes in said foot and ears to interconnect the same and releasable latch means carried by said foot and engaging said pin for holding said pin from accidental displacement and releasable to permit removal of said pad.

24. A suction breaking pad mechanism for a fruit processing machine comprising an elongated stem having a foot provided with a cylindrical chamber, a suction breaking pad mounted on said foot, said pad having an aperture registering with the chamber in the foot, a shell slidably mounted in said chamber and registering with the hole in said suction breaking pad, spring means mounted in said chamber of the foot and confined by one of the walls of said chamber and pressing upon the inner end face of said shell whereby normally to project said shell in advance of the suction breaking pad through the opening in said pad.

25. A suction breaking pad mechanism for a fruit processing machine comprising an elongated stem having a foot provided with a cylindrical chamber, a suction breaking pad mounted on said foot, said pad having an aperture registering with the chamber in the foot, a shell slidably mounted in said chamber and registering with the hole in said suction breaking pad, spring means mounted in said chamber of the foot and confined by one of the walls of said chamber and pressing upon the inner end face of said shell whereby normally to project said shell in advance of the suction breaking pad through the opening in said pad, and shoulder means on said shell engaging a stop portion on the inner wall of said chamber for limiting the outward projection of said shell.

26. In combination with a stationary support, a pair of fruit cups mounted on said support in spaced relation, a peeling head vertically shiftable on said support toward and from said cups, power means associated with said support, said peeling head being supported above said cups in spaced relation therefrom when said peeling head is positioned adjacent said cups, a pair of arcuately shiftable peeling knives mounted on said peeling head and adapted to be positioned adjacent the cut faces of the half fruit held in said cups when the peeling head is moved relatively adjacent said cups, mechanism operated by said source of power for acuately shifting said peeling knives, a pair of spaced auxiliary fruit holding means each comprising a pad and a connected elongated stem, said stems and pads being shiftably mounted on said peeling head for contact with the cut faces of the half fruit during at least a portion of the peeling operation, a peeling stem guide block rigidly mounted on the upper end of each peeling pad stem, spring means confined between each guide block and an upper portion of said head, for normally pressing each peeling pad toward the cut face of the half fruit on movement of the peeling head toward said fruit holders, a peeling pad lifter yoke mounted below said spaced peeling pad guide blocks and guidingly engaging each of said guide blocks on movement of the peeling pad lifter yoke, cam means mounted on the stationary support of the machine in the path of movement of the peeling head and cooperative lever means on said peeling head and operated by said cam means on predetermined movement of said peeling head for actuating said peeling pad lifter yoke to raised position after a sufficient interval subsequent to the completion of the peeling operation to raise the peeling pad stems against the compressive action of their springs tending to maintain the peeling pads in contact with the cut faces of the half fruit so as to raise said peeling pads from the cut faces of the half fruit after the peeling knives have been raised by the upward travel of the peeling head away from the cut faces of the half fruit a sufficient distance to sever peeling entangled between the fruit and the peeling knives said raising of said peeling pads operating to position the peeling pads relatively close to the axis of turning of the peeling knives.

27. In combination with a support, a stationary cup section mounted on said support, a movable cup section, a bracket mounted on said stationary cup section and forming a hinge or pivot for said movable cup section, said cup sections being shaped to receive a half fruit therebetween with its cut face outermost, said movable cup section having a depending arm rigid therewith and provided with an operating roller, operating means for said arm comprising a member shiftably mounted for movement to and from said cup sections, said member having a first arm formed with an elongated slot and having a laterally extending arm provided at its extremity with a cam actuable roller and having still another arm provided with means for connection to the end of a coil spring, and an elongated cup operating arm having a cam surface for contacting the depending roller on said movable cup section, said arm terminating in a head provided with means for adjustably attaching said head to the slotted arm of said member whereby said elongated movable cup operating arm may be adjusted longitudinally of the slot of said adjustable member to take up wear between the cup operating arm and the depending roller on the movable cup section.

28. In a device for cutting half peaches having pit cavities, the combination of a substantially cup-shaped fruit holder adapted to receive and hold a half peach with its cut face exposed and with its longitudinal pit cavity axis extending in predetermined direction, peeling means adapted arcuately to swing about an axis disposed parallel to and substantially coincident with the longitudinal pit cavity axis of the half peach and through the flesh of the half fruit to peel the same, said half fruit shifting laterally in and with respect to the walls of its cup and normal to the axis of turning of said peeling means during said peeling operation, an auxiliary fruit holder having a relatively flat face adapted to contact the cut face of the half fruit during the peeling operation, and an elongated knockout pad having a substantially flat face adapted to overlie the pit section of the half peach and having laterally extending portions disposed normal to the longitudinal pit cavity axis and straddling the pit section and adapted to contact the cut face of the half fruit on substantially diametrically opposite sides of the pit section whereby to permit lateral movement of the half fruit in the fruit holder during the peeling operation and while said knockout pad is maintained in contact with the cut face of the half fruit.

29. In a fruit treating apparatus, in combination with main fruit holding means for holding a half fruit with its cut face exposed, peeling means adapted arcuately to move through the flesh of the half fruit to peel the same, power actuated means for relatively moving the fruit holding means and the peeling means into juxtaposed peeling position or to separated position, auxiliary fruit holding means having a portion adapted to contact the cut face of the half fruit, and means for maintaining said auxiliary fruit holding means in contact with the cut face of the half fruit during peeling and thereafter until the peeling means and main fruit holding means have been relatively separated sufficiently to rupture any peeling interconnecting the half fruit and peeling means, and means operable after the rupture of said interconnected peel for relatively separating said main fruit holding means and said auxiliary fruit holding means at a faster rate than said main fruit holding means and said peeling means are relatively separated.

30. In a fruit treating apparatus, in combination with main fruit holding means for holding a half fruit with its cut face exposed, peeling means adapted arcuately to move through the flesh of the half fruit to peel the same while held in the fruit holding means, power actuated means for relatively moving the fruit holding means and the peeling means into juxtaposed position and also into a position wherein the same are separated, auxiliary fruit holding means carried by the peeling means adapted to be maintained in contact with the cut face of the half fruit during peeling and also during sufficient time in which the peeling means and the cut face of the half fruit are relatively separated, to cause any peeling entangling with the peeling knife and the fruit to be ruptured or severed, and means operable as the peeling means and the main fruit holding means are being relatively displaced for moving the auxiliary fruit holding means toward the peeling means at a rate of travel faster than the relative rate of displacement of the peeling means and the main fruit holding means whereby to restore the position of the auxiliary fruit holding means relatively to the peeling means.

HENRY A. SKOG.

REFERENCES CITED

The following references are of record in the file of this patent:

UNITED STATES PATENTS

| Number | Name | Date |
|---|---|---|
| 2,216,165 | Ewald et al. | Oct. 1, 1940 |
| 2,242,243 | Ewald et al. | May 20, 1941 |
| 2,266,748 | Ewald | Dec. 23, 1941 |
| 2,302,688 | Ewald | Nov. 24, 1942 |
| 2,335,849 | Ewald | Dec. 7, 1943 |
| 2,458,506 | Ewald et al. | Jan. 11, 1949 |